US008665196B2

(12) United States Patent
Fukano et al.

(10) Patent No.: US 8,665,196 B2
(45) Date of Patent: Mar. 4, 2014

(54) DISPLAY APPARATUS AND DISPLAY METHOD

(75) Inventors: Tomoyuki Fukano, Kanagawa (JP); Toshihiko Orii, Kanagawa (JP); Hiroshi Nakao, Kanagawa (JP); Naoyuki Itakura, Kanagawa (JP)

(73) Assignee: Japan Display West Inc., Aichi (JP)

( * ) Notice: Subject to any disclaimer, the term of this patent is extended or adjusted under 35 U.S.C. 154(b) by 1037 days.

(21) Appl. No.: 12/197,380

(22) Filed: Aug. 25, 2008

(65) Prior Publication Data

US 2009/0058780 A1 Mar. 5, 2009

(30) Foreign Application Priority Data

Aug. 31, 2007 (JP) ................................ 2007-227168

(51) Int. Cl.
*G09G 3/36* (2006.01)
*G06F 3/038* (2013.01)
*G09G 5/00* (2006.01)

(52) U.S. Cl.
USPC ............... 345/90; 345/87; 345/204; 345/214; 345/209; 345/215

(58) Field of Classification Search
USPC ........................ 345/87, 90–93, 204, 208–210
See application file for complete search history.

(56) References Cited

U.S. PATENT DOCUMENTS

| | | | | |
|---|---|---|---|---|
| 4,956,587 | A * | 9/1990 | Kitou et al. | 315/408 |
| 6,911,966 | B2 * | 6/2005 | Hector et al. | 345/96 |
| 2003/0038767 | A1 | 2/2003 | Hector et al. | |
| 2006/0103618 | A1 * | 5/2006 | Miura | 345/96 |
| 2007/0057887 | A1 * | 3/2007 | Itakura et al. | 345/90 |

FOREIGN PATENT DOCUMENTS

| | | |
|---|---|---|
| CN | 1545690 | 11/2004 |
| JP | 11-119746 | 4/1999 |
| JP | 2000-298459 | 10/2000 |
| JP | 2007-065076 | 3/2007 |
| WO | WO2004023449 | 3/2004 |

OTHER PUBLICATIONS

European Search Report corresponding to European Serial No. 08014647.5 dated Nov. 30, 2009.
Chinese Office Action from counterpart CN Application No. 200810215110.4 dated Apr. 11, 2013.

* cited by examiner

*Primary Examiner* — Sumati Lefkowitz
*Assistant Examiner* — David Tung
(74) *Attorney, Agent, or Firm* — Dentons US LLP

(57) ABSTRACT

A display apparatus including: a pixel section having a plurality of pixel circuits arranged two-dimensionally by being each provided at an intersection of a scan line and a signal line as a circuit including a switching device, a display element and a storage capacitor; and a correction circuit for correcting a storage-capacitor voltage supplied to the storage capacitors, wherein the correction circuit employs a comparator for detecting the difference between electric potentials received from a portion of the pixel section as a pixel electric potential having a positive polarity and a pixel electric potential having a negative polarity and for comparing the difference in electric potential with a reference voltage, and an output-voltage control circuit for converting a comparison result output by the comparator into a correction signal used for correcting the storage-capacitor voltage to be asserted on a storage-capacitor line used for supplying the storage-capacitor voltage.

4 Claims, 14 Drawing Sheets

FIG.4
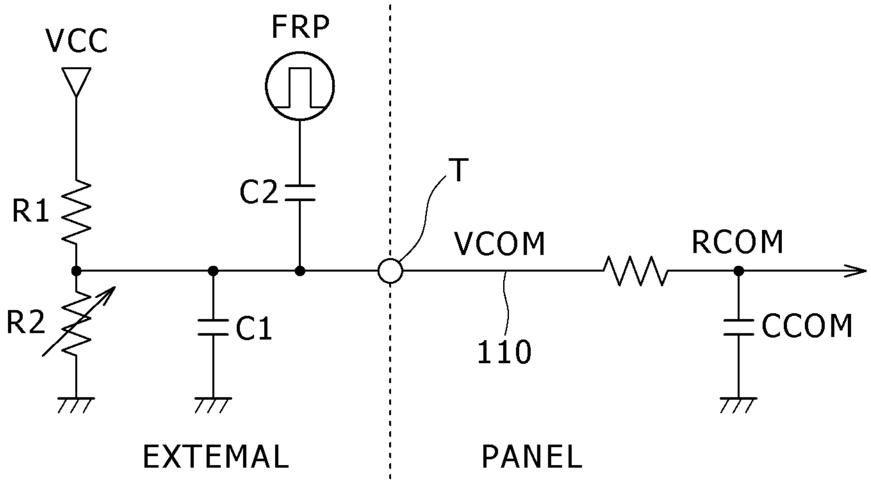
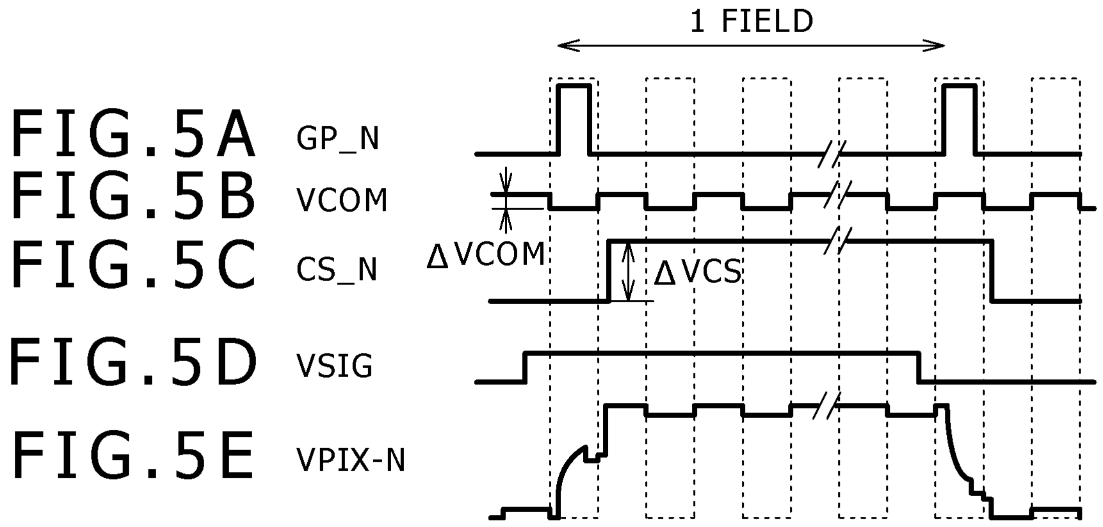
FIG.6
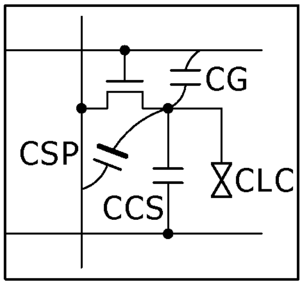

FIG.15
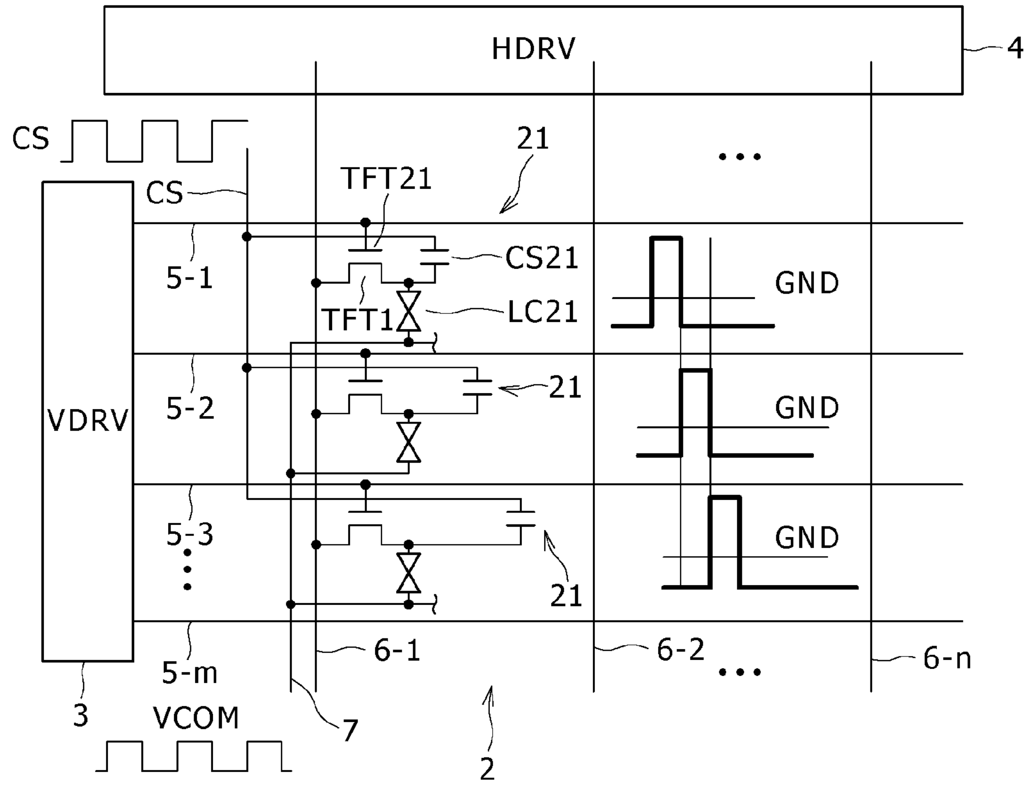
FIG.16A
FIG.16B
FIG.16C
FIG.16D
FIG.16E
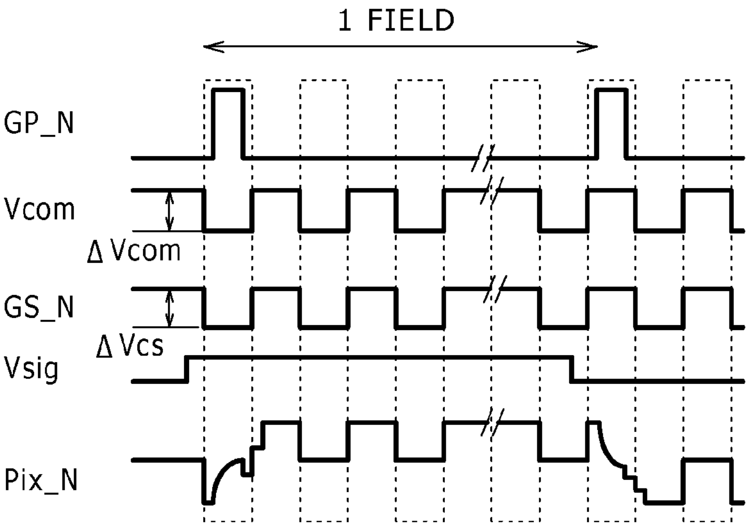

DISPLAY APPARATUS AND DISPLAY METHOD

CROSS REFERENCES TO RELATED APPLICATIONS

The present invention contains subject matter related to Japanese Patent Application JP 2007-227168 filed with the Japan Patent Office on Aug. 31, 2007, the entire contents of which being incorporated herein by reference.

BACKGROUND OF THE INVENTION

1. Field of the Invention

The present invention relates to an active-matrix display apparatus including pixel display elements (each also referred to as a pixel electro-optical device) arranged to form a matrix in a display area and relates to a pixel electric-potential correction method.

2. Description of the Related Art

Typical display apparatus include a liquid-crystal display apparatus typically employing pixel circuits each including a liquid-crystal cell functioning as a display element also referred to as an electro-optical device. The liquid-crystal display apparatus is characterized in that the apparatus is thin and has a low power consumption. The liquid-crystal display apparatus is used as a display unit in a wide range of electronic equipment such as a personal digital assistant (PDA), a hand-held phone, a digital camera, a video camera and a personal computer.

FIG. 15 is a diagram roughly showing a typical configuration of an existing liquid-crystal display apparatus 1. For more information on this liquid-crystal display apparatus 1, the reader is suggested to refer to Patent Documents 1 and 2 (Japanese Patent Laid-open No. Hei 11-119746 and Japanese Patent laid-Open No. 2000-298459 (hereinafter referred to as Patent Document. 1 and 2)). As shown in FIG. 15, the liquid-crystal display apparatus 1 employs an available pixel section 2, a vertical driving circuit (VDRV) 3 and a horizontal driving circuit (HDRV) 4 which are provided on the peripheries of the available pixel section 2.

In the available pixel section 2, a plurality of pixel circuits 21 are arranged to form a matrix. Each of the pixel circuits 21 includes a thin-film transistor TFT21 functioning as a switching device, a liquid-crystal cell LC21 and a storage capacitor CS21. The TFT is an abbreviation for the thin-film transistor. The first pixel electrode of the liquid-crystal cell LC21 is connected to the drain electrode (or the source electrode) of the thin-film transistor TFT21. The drain electrode of the thin-film transistor TFT21 is also connected to the one of electrodes of the storage capacitor CS21.

Scan lines (or gate lines) 5-1 to 5-*m* are each provided for a row of the matrix. The scan lines 5-1 to 5-*m* are arranged in the column direction. Signal lines 6-1 to 6-*n* arranged in the row direction are each provided for a column of the matrix.

As described above, the gate electrodes of the thin-film transistors TFT21 employed in the pixel circuits 21 provided on a row are connected to a scan line (one of the scan lines 5-1 to 5-*m*) provided for the row. On the other hand, the source (or drain) electrodes of the thin-film transistors TFT21 employed in the pixel circuits 21 provided on a column are connected to a signal line (one of the signal lines 6-1 to 6-*n*) provided for the column.

In addition, in the case of an ordinary liquid-crystal display apparatus, a storage-capacitor line Cs is provided separately. The storage capacitor CS21 is connected between the storage-capacitor line Cs and the first electrode of the liquid-crystal cell LC21. Pulses having the same phase as a common voltage Vcom are applied to the storage-capacitor line Cs. In addition, the storage capacitor CS21 of every pixel circuit 21 on the available pixel section 2 is connected to the storage-capacitor line Cs serving as a line common to all the storage capacitors Cs21.

On the other hand, the second pixel electrode of the liquid-crystal cell LC21 of every pixel circuit 21 is connected to a supply line 7. The supply line 7 provides the common voltage Vcom, which is a series of pulses with a polarity typically changing once every horizontal scan period. One horizontal scan period is referred to as 1H.

FIGS. 16A to 16E show timing charts of the so-called 1H Vcom inversion driving method of the ordinary liquid-crystal display apparatus shown in FIG. 15.

Incidentally, a capacitive coupling driving method has the following problems. If a liquid-crystal material exhibiting the characteristic of the liquid-crystal dielectric constant ∈ to an applied voltage is used in a liquid-crystal display apparatus, a luminance change observed at a manufacturing time as a luminance change in a liquid crystal gap is seen to have a big value, causing a problem in consideration of an effective pixel electric potential. An example of the liquid crystal material exhibiting the characteristic of the liquid crystal dielectric constant ∈ to an applied voltage is the normally white liquid crystal.

In addition, an effort to optimize the black luminance faces a problem of the white luminance becoming black, that is, a problem of the white luminance sinking.

In order to solve the problems of the capacitive coupling driving method, a display apparatus disclosed in Japanese patent Laid-Open No. 2007-65076 is provided. The display apparatus employs a correction circuit system for correcting the dynamic range of an available pixel section of the display apparatus. The display apparatus employing the existing correction circuit system is explained by referring to FIGS. 17 and 18. FIG. 17 is a block diagram showing the display apparatus.

The display apparatus shown in FIG. 17 employs an available pixel section 34, a monitor pixel section 35 and a correction circuit 30. The available pixel section 34 is a section serving as the actual display surface. The monitor pixel section 35 is a section having a configuration identical with the configuration of the available pixel section 34. The monitor pixel section 35 has dummy pixels used for a correction purpose. The correction circuit 30 is a circuit for correcting a signal received from the monitor pixel section 35 to a proper signal. The correction circuit 30 employs a comparator 31, an output-voltage control circuit 32 and a timing generator 33. The comparator 31 is a section for comparing the signal received from the monitor pixel section 35 with a reference voltage. The output-voltage control circuit 32 is a section for outputting the proper signal mentioned above as a signal controlled on the basis of a comparison result output by the comparator 31. The timing generator 33 is a section for controlling the operations of the comparator 31 and the output-voltage control circuit 32.

In the display apparatus having the configuration described above, first of all, the comparator 31 compares a pixel electric potential VpixH received from the monitor pixel section 35 as an electric potential having the positive polarity with a reference voltage Vref. The comparator 31 is actually a comparator 36 shown in FIG. 18. That is to say, the comparator 36 receives the pixel electric potential VpixH having the positive polarity and the reference voltage Vref, comparing the pixel electric potential VpixH with the reference voltage Vref in accordance with control executed by the timing generator 33.

The reference voltage Vref is typically set at 2.85 V. Thus, the comparator 36 compares the pixel electric potential VpixH with the reference voltage Vref in order to determine whether the pixel electric potential VpixH is higher or lower than 2.85 V. Then, the comparator 31 outputs a signal to the output-voltage control circuit 32 as a comparison result indicating that the pixel electric potential VpixH is higher or lower than 2.85 V. On the basis of the signal received from the comparator 31, the output-voltage control circuit 32 outputs a correction signal (or the proper signal mentioned above) to the available pixel section 34 as a signal for generating a proper pixel electric potential. In the display apparatus employing the correction circuit 30 having a configuration described above, the correction circuit 30 finds a proper signal from a signal detected by the monitor pixel section 35 and outputs the proper signal to the available pixel section 34 having a configuration identical with the configuration of the monitor pixel section 35.

It is to be noted that the proper signal output by the correction circuit 30 is also fed back to the monitor pixel section 35 while the operation to drive the display apparatus is being carried out.

SUMMARY OF THE INVENTION

Incidentally, in the comparator 31 employed in the existing correction circuit 30 described above, only the absolute value of the pixel electric potential VpixH output by the AC-driven monitor pixel section 35 as an electric potential on the positive-polarity side is detected and compared with the reference voltage Vref in order to eventually generate a correction signal X and output to the available pixel section 34 in order to correct the pixel electric potential.

FIG. 19 is a plurality of diagrams each showing portions of the waveforms of the pixel electric potential VpixH on the positive-polarity side and the pixel electric potential VpixL on the negative-polarity side. To be more specific, FIG. 19A is a diagram showing portions of the waveforms of signals generated without carrying out a correction process. On the other hand, FIG. 19B is a diagram showing portions of the waveforms of signals generated as a result of a correction process carried out by the existing correction circuit 30. An arrow 50 indicates the proper pixel amplitude (referred to as the dynamic range) of the pixel electric potential spread over the positive and negative-polarity sides. It is desirable to carry out a correction process in order to maintain the pixel amplitude indicated by the arrow 50 at a fixed value. As shown in the diagram of FIG. 19B, however, in the existing correction circuit 30 described above, only the absolute value of the pixel electric potential VpixH is detected and compared with the reference voltage Vref in order to eventually generate a correction signal X. Thus, the pixel electric potential VpixL having the negative polarity is not corrected correctly. As a result, the pixel amplitude of the pixel electric potential spread over the positive and negative-polarity sides is different from the proper pixel electric potential. That is to say, the magnitude of a positive-polarity leak current flowing through the thin-film transistor employed in a pixel circuit may be different from the magnitude of a negative-polarity leak current flowing through the thin-film transistor employed in the pixel circuit. In this case, a voltage drop on the positive-polarity side is also different from a voltage drop on the negative-polarity side. Thus, if only the pixel electric potential as an electric potential on the positive-polarity side is detected and compared with the reference voltage Vref in order to eventually generate a correction signal X, the pixel electric potential VpixL having the negative polarity is not corrected correctly. In addition, if such a correction process is carried out in the existing apparatus, the γ characteristic is adversely worsened, the yield is lowered and the merchantability is deteriorated.

Addressing the problems described above, inventors of the present invention have innovated a display apparatus capable of optimizing the luminance.

It is desirable to solve the problems described above. In a display apparatus provided by the present embodiment, the display apparatus employs a pixel section having a plurality of pixel circuits arranged two-dimensionally by being each provided at an intersection of a scan line and a signal line as a circuit including a switching device, a display element and a storage capacitor, and a correction circuit for correcting a storage-capacitor voltage supplied to the storage capacitors. The correction circuit employs a comparator for detecting the difference between electric potentials received from a portion of the pixel section as a pixel electric potential having a positive polarity and a pixel electric potential having a negative polarity and for comparing the difference in electric potential with a reference voltage, and an output-voltage control circuit for converting a comparison result output by the comparator into a correction signal used for correcting the storage-capacitor voltage to be asserted on a storage-capacitor line used for supplying the storage-capacitor voltage.

The correction circuit employed in the display apparatus provided by the present embodiment detects the difference between a pixel electric potential having a positive polarity and a pixel electric potential having a negative polarity, comparing the difference in electric potential with a reference voltage in order to generate such a correction signal that the difference in electric potential remains constant all the time and supply the correction signal to the pixel section as a signal for correcting the storage-capacitor voltage. Thus, the optical characteristic of the pixel section is optimized.

In addition, a pixel electric potential correction method is provided by the present embodiment as a pixel electric potential correction method to be adopted in a display apparatus employing a pixel section having a plurality of pixel circuits arranged two-dimensionally by being each provided at an intersection of a scan line and a signal line as a circuit including a switching device, a display element and a storage capacitor, and a correction circuit for correcting a storage-capacitor voltage supplied to the storage capacitors. The pixel electric potential correction method includes the step of driving the correction circuit to detect the difference between electric potentials received from a portion of the pixel section as a pixel electric potential having a positive polarity and a pixel electric potential having a negative polarity and a comparator to compare the difference in electric potential with a reference voltage. The pixel electric potential correction method further includes the step of driving an output-voltage control circuit to convert a comparison-result signal generated by the comparator into a correction signal used for correcting the storage-capacitor voltage to be asserted on a storage-capacitor line used for supplying the storage-capacitor voltage.

In accordance with pixel electric potential correction method provided by the present embodiment, the correction circuit employed in the display apparatus detects the difference between a pixel electric potential having a positive polarity and a pixel electric potential having a negative polarity, comparing the difference in electric potential with a reference voltage in order to generate such a correction signal that the difference in electric potential remains constant all the time and supply the correction signal to the pixel section as a signal for correcting the storage-capacitor voltage. Thus, the optical characteristic of the pixel section is optimized.

In accordance with the present invention, the pixel electric potential in the pixel section is corrected so that the luminance is optimized and the yield is improved.

BRIEF DESCRIPTION OF THE DRAWINGS

These and other objects and features of the present invention will become clear from the following description of the preferred embodiments given with reference to the accompanying diagrams, in which:

FIG. 4 is a diagram showing a typical configuration of a common-voltage generation circuit according to the first embodiment of the present invention;

FIGS. 5A to 5E show typical timing charts of signals appearing in the display apparatus according to the first embodiment of the present invention;

FIG. 6 is a diagram showing an equivalent circuit for parasitic capacitances in the display apparatus according to the first embodiment of the present invention;

FIG. 15 is a diagram roughly showing a typical configuration of the existing display apparatus;

FIGS. 16A to 16E show timing charts of the existing display apparatus shown in the diagram of FIG. 15;

DETAILED DESCRIPTION OF THE PREFERRED EMBODIMENTS

Preferred embodiments of the present invention are described by referring to diagrams as follows.

Figure 1:
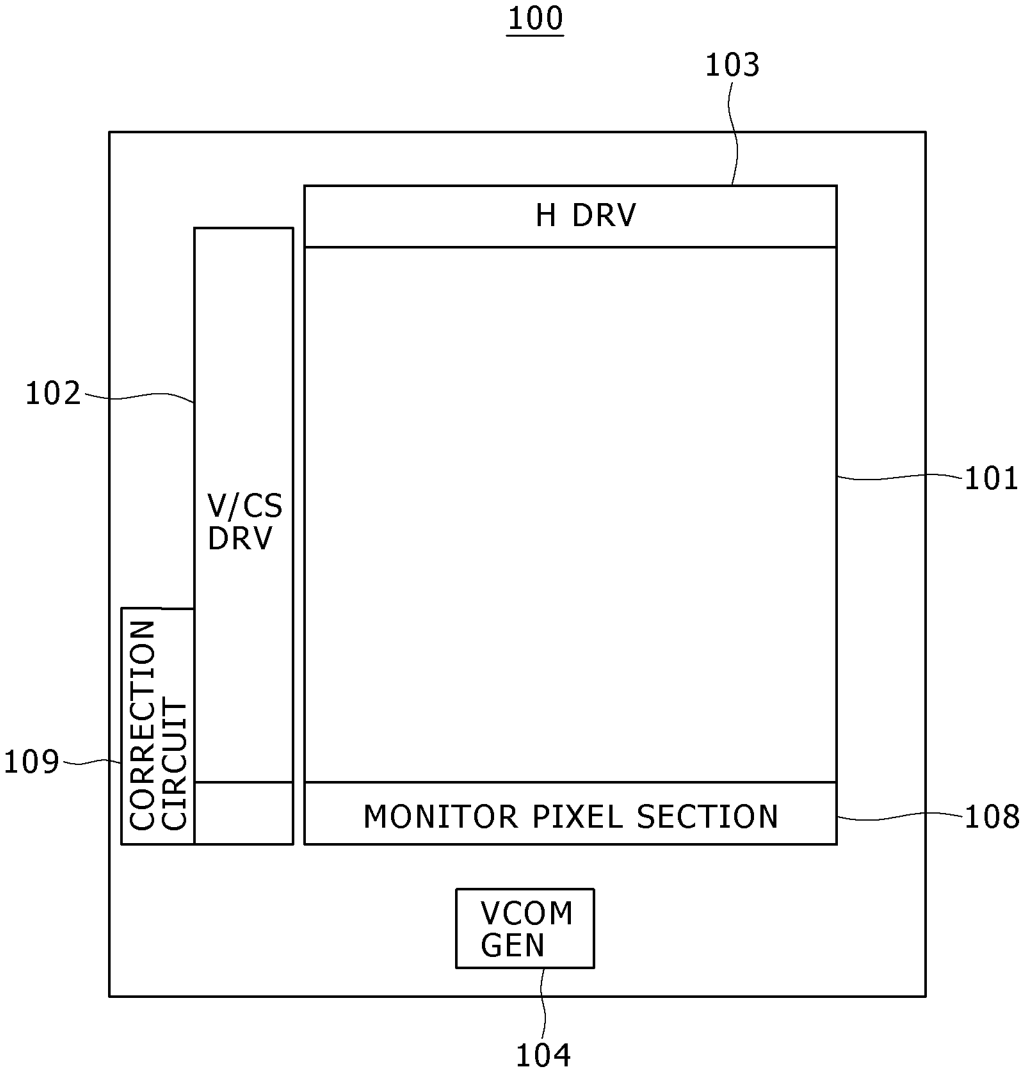
FIG. 1 is a diagram roughly showing the configuration of a display apparatus according to a first embodiment of the present invention.
Figure 2:
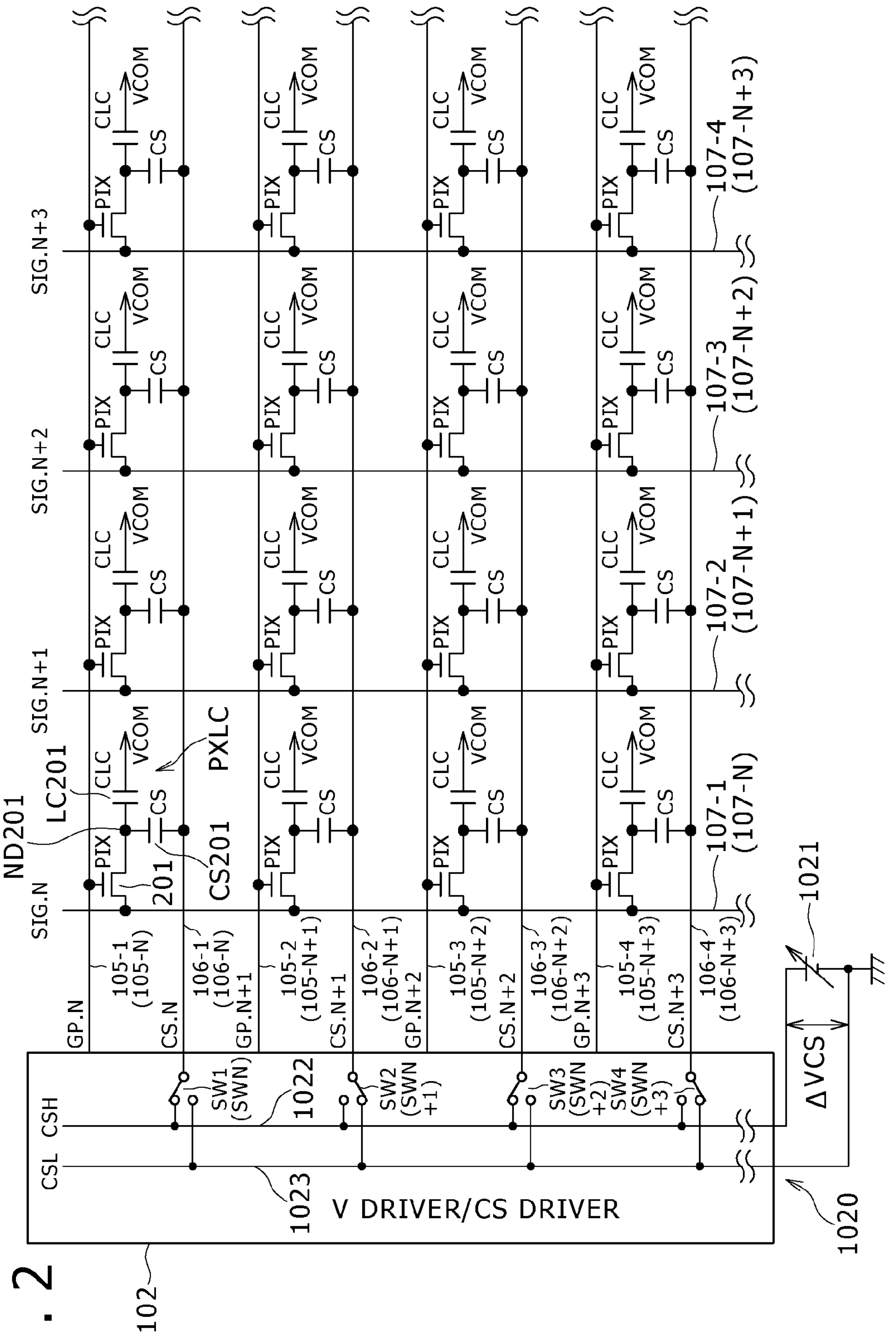
FIG. 2 is a diagram showing an equivalent circuit of main elements employed in the display apparatus according to the first embodiment of the present invention.
Figures 3A, 3B, 3C, 3D, 3E, 3F, 3G, 3H, 3I, 3J, 3K, 3L:
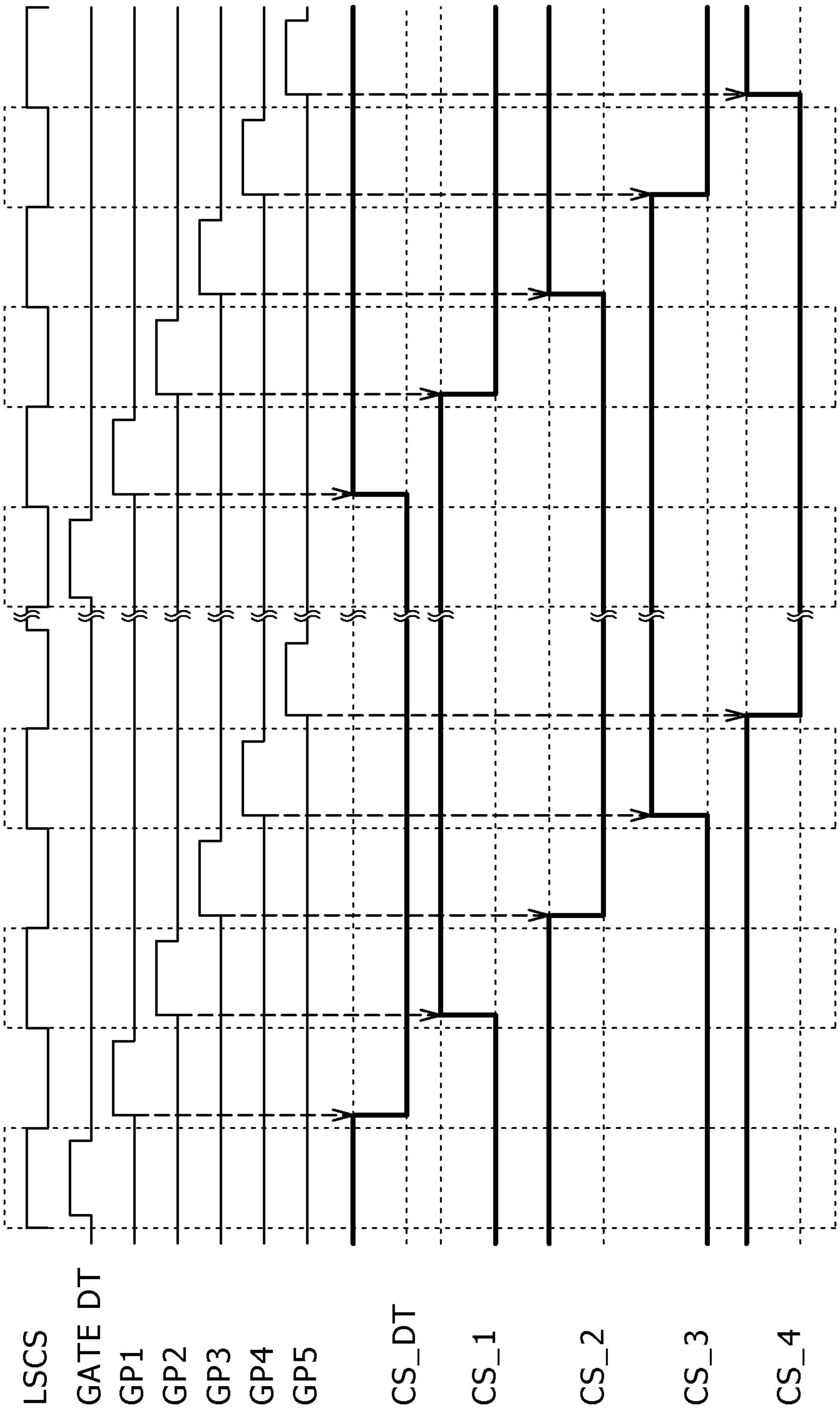
FIGS. 3A to 3L show typical timing charts of signals appearing in the display apparatus according to the first embodiment of the present invention.

FIG. 1 is a diagram roughly showing the configuration of a liquid-crystal display apparatus according to a first embodiment of the present invention. The liquid-crystal display apparatus 100 according to the first embodiment is a display apparatus of the active-matrix type and also a display apparatus adopting the capacitive coupling driving method. For example, the liquid-crystal display apparatus 100 employs display elements (each also referred to as an electro-optical device) each functioning as a liquid crystal cell. FIG. 2 is a diagram showing an equivalent circuit of main elements employed in the liquid-crystal display apparatus 100.

As shown in the diagram of FIG. 1, the liquid-crystal display apparatus 100 according to the first embodiment has an available pixel section 101, a vertical driving circuit 102, a horizontal driving circuit 103, a common-voltage generation circuit 104, a monitor pixel section 108 and a correction circuit 109.

As shown in the diagram of FIG. 2, the available pixel section 101 includes a plurality of pixel circuits PXLC arranged to form an m×n matrix. In this case, typically, 320×RGB×320 pixel circuits PXLC are laid out so as to allow a normal display to be provided as a whole. It is to be noted that, in order to make FIG. 2 simple, the pixel circuits PXLC are arranged to form a 4×4 matrix. As shown in the diagram of FIG. 2, each of the pixel circuits PXLC includes a thin-film transistor TFT201 functioning as a switching device, a liquid-crystal cell LC201 and a storage capacitor CS201. The TFT is an abbreviation for the thin-film transistor. A first pixel electrode of the liquid-crystal cell LC201 is connected to the drain electrode (or the source electrode) of the thin-film transistor TFT201. The drain electrode (or the source electrode) of the thin-film transistor TFT201 is also connected to the first electrode of the storage capacitor CS201. It is to be noted that the point of connection between the drain electrode of the thin-film transistor TFT201, the first pixel electrode of the liquid-crystal cell LC201 and the first electrode of the storage capacitor CS201 forms a node ND201.

Scan lines (or gate lines) 105-1 to 105-*m* and storage-capacitor lines (each referred to hereafter as a storage line) 106-1 to 106-*m* are each provided for a row of the matrix and connected to the gate electrodes of the thin-film transistors TFT201 employed in the pixel circuits PXLC provided on the row. The scan lines 105-1 to 105-*m* and the storage lines 106-1 to 106-*m* are arranged in the row direction. On the other hand, signal lines 107-1 to 107-*n* arranged in the column direction are each provided for a column of the matrix. Each of the pixel circuits PXLC is located at one of the intersections of the scan lines (or gate lines) 105-1 to 105-*m* and the signal lines 107-1 to 107-*n*.

As described above, the gate electrodes of the thin-film transistors TFT201 employed in the pixel circuits PXLC provided on a row are connected to a scan line (one of the scan lines 105-1 to 105-*m*) provided for the row.

By the same token, the second electrodes of the storage capacitors Cs201 employed in the pixel circuits PXLC provided on a row are connected to a storage-capacitor line (one of the storage lines 106-1 to 106-*m*) provided for the row.

On the other hand, the source (or drain) electrodes of the thin-film transistors TFT21 employed in the pixel circuits PXLC provided on a column are connected to a signal line (one of the signal lines 107-1 to 107-*n*) provided for the column.

By the same token, the second pixel electrodes of the liquid crystal cells LC201 employed in the pixel circuits PXLC are connected to a supply line serving as a line common to all the liquid crystal cells. Not shown in the figure, the supply line is a line used for providing a common voltage Vcom, which is a series of pulses with a small amplitude and a polarity typically changing once every horizontal scan period. A horizontal scan period is referred to as 1H.

Each of the gate lines 105-1 to 105-*m* is driven by a gate driver VDRV employed in the vertical driving circuit 102 shown in the diagram of FIG. 1 whereas each of the storage-capacitor lines 106-1 to 106-*m* is driven by a capacitor driver CSDRV also employed in the vertical driving circuit 102. On the other hand, each of the signal lines 107-1 to 107-*n* is driven by the horizontal driving circuit 103.

In actuality, the available pixel section 101 includes the aforementioned monitor pixel section 108 which is a row having dummy pixels or which has dummy pixels. The monitor pixel section 108 has a pixel configuration identical with the pixel configuration of the ordinary available pixel section. For example, the available pixel section 101 includes the monitor pixel section 108 which is 1 row or an extra row. The 1 row or the extra row is typically the mth row at the bottom of the available pixel section 101.

As will be described later in detail, a capacitor signal CS (also referred to hereafter as a storage-capacitor signal) asserted by the storage driver CSDRV of the vertical driving circuit 102 on the storage-capacitor lines 106 is corrected so that a pixel electric potential detected in the monitor pixel section 108 becomes equal to a certain electric potential. The storage-capacitor signal CS is supplied to the storage capacitor CS201 as a storage-capacitor voltage.

The vertical driving circuit 102 basically scans the rows of the matrix in the vertical direction or the row-arrangement direction in 1 field period. In the scan operation, the vertical driving circuit 102 scans the rows sequentially in order to select a row at one time, that is, in order to select pixel circuits PXLC provided on a selected row as pixels circuits connected to a gate line (one of the gate lines 105-1 to 105-*m*) provided for the selected row. To put it in detail, the vertical driving circuit 102 asserts a gate pulse GP1 on the gate line 105-1 in order to select pixel circuits PXLC provided on the first row. Then, the vertical driving circuit 102 asserts a gate pulse GP2 on the gate line 105-2 in order to select pixel circuits PXLC provided on the second row. Thereafter, the vertical driving circuit 102 sequentially asserts gate pulses GP3 . . . and GPm on the gate lines 105-3 . . . and 105-*m* respectively in the same way.

In addition, the storage-capacitor lines 106-1 to 106-*m* are provided independently of each other for respectively the gate lines 105-1 to 105-*m* which are each provided for one of the rows of the matrix. The vertical driving circuit 102 also asserts storage-capacitor signals CS1 to CSm on the storage-capacitor lines 106-1 to 106-*m* respectively. Each of the storage-capacitor signals CS1 to CSm is set selectively at a first level CSH such as a voltage in the range 3 to 4 V or a second level CSL such as 0V. FIG. 2 also shows the model of a typical level select output section of a CS driver 1020 (or the capacitor driver CSDRV cited earlier) employed in the vertical driving circuit 102. As shown in the figure, the CS driver 1020 includes a variable power supply 1021, a first-level supply line 1022, a second-level supply line 1023 and switches SW1 to SWm for selectively connecting the first-level supply line 1022 or the second-level supply line 1023 to the storage-capacitor lines 106-1 to 106-*m* respectively. The first-level supply line 1022 is connected to the positive terminal of the variable power supply 1021. On the other hand, the second-level supply line 1023 is connected to the negative terminal of the variable power supply 1021. The switches SW1 to SWm selectively connects the first-level supply line 1022 or the second-level supply line 1023 to the storage-capacitor lines 106-1 to 106-*m* respectively.

Notation ΔVcs shown in the diagram of FIG. 2 denotes the difference between the first level CSH and the second level CSL. In the following description, this difference is also referred to as a CS electric potential ΔVcs.

As will be described later in detail, each of the CS electric potential ΔVcs and an amplitude ΔVcom is set at such a value that both the black luminance and the white luminance can be optimized. The amplitude ΔVcom is the amplitude of the AC common voltage Vcom having a small amplitude. As will be described later, for example, in the case of a white display, each of the CS electric potential ΔVcs and the amplitude ΔVcom is set at such a value that an effective pixel electric potential ΔVpix-W applied to the liquid crystal does not exceed 0.5 V.

Each of the storage-capacitor signals CS1 to CSm is selectively set at the first level CSH or the second level CSL by respectively the switches SW1 to SWm which are each connected to the first-level supply line 1022 or the second-level supply line 1023.

FIGS. 3A to 3L show typical timing charts of the gate pulses GP1 to GPm generated by the vertical driving circuit 102 and the storage-capacitor signals CS1 to CSm asserted by the vertical driving circuit 102.

The vertical driving circuit 102 drives the gate lines 105-1 to 105-*m* and the storage-capacitor lines 106-1 to 106-*m* sequentially, starting typically from the first gate line 105-1 and the first storage-capacitor line 106-1 respectively. After a gate pulse GP is asserted on a gate line (one of the gate lines 105-1 to 105*m*) in order to write an image signal into a pixel circuit PXLC connected to the gate line, the level of the storage-capacitor signal (one of the storage-capacitor signals CS1 to CSm) conveyed by the storage-capacitor line (one of the storage-capacitor lines 106-1 to 106-*m*) connected to the pixel circuit PXLC to supply the storage-capacitor signal to the pixel circuit PXLC is changed from the first level CSH to the second level CSL or vice versa by the switch (one of the switches SW1 to SWm) connected to the storage-capacitor line. The storage-capacitor signals CS1 to CSm conveyed by the storage-capacitor lines 106-1 to 106-*m* are set at the first level CSH or the second level CSL in an alternate way described as follows.

For example, when the vertical driving circuit 102 supplies the storage-capacitor signal CS1 set at the first level CSH to the pixel circuit PXLC through the first storage-capacitor line 106-1, the vertical driving circuit 102 then supplies the storage-capacitor signal CS2 set at the second level CSL to the pixel circuit PXLC through the second storage-capacitor line 106-2, the storage-capacitor signal CS3 set at the first level CSH to the pixel circuit PXLC through the third storage-capacitor line 106-3 and the storage-capacitor signal CS4 set at the second level CSL to the pixel circuit PXLC through the fourth storage-capacitor line 106-4 subsequently. In the same way, the vertical driving circuit 102 thereafter sets the storage-capacitor signals CS5 to CSm at the first level CSH or the second level CSL alternately and supplies the storage-capacitor signals CS5 to CSm to the pixel circuit PXLC through the storage-capacitor lines 106-5 to 106-*m* respectively.

When the vertical driving circuit 102 supplies the storage-capacitor signal CS1 set at the second level CSL to the pixel circuit PXLC through the first storage-capacitor line 106-1, on the other hand, the vertical driving circuit 102 then supplies the storage-capacitor signal CS2 set at the first level CSH to the pixel circuit PXLC through the second storage-capacitor line 106-2, the storage-capacitor signal CS3 set at the second level CSL to the pixel circuit PXLC through the third storage-capacitor line 106-3 and the storage-capacitor signal CS4 set at the first level CSH to the pixel circuit PXLC through the fourth storage-capacitor line 106-4 subsequently. In the same way, the vertical driving circuit 102 thereafter sets the storage-capacitor signals CS5 to CSm at the first level CSH or the second level CSL alternately and supplies the storage-capacitor signals CS5 to CSm to the pixel circuit PXLC through the storage-capacitor lines 106-5 to 106-*m* respectively.

In this embodiment, after the rising edge of a gate pulse GP asserted on a specific one of the gate lines 105-1 to 105-*m*, that is, after an image signal is written into a pixel circuit PXLC connected to the specific gate line 105, the storage-capacitor lines 106-1 to 106-*m* are driven as described above and, due to the capacitive coupling effect of the storage capacitors CS201, in each of the pixel circuits PXLC, an electric potential appearing on the node ND201 is changed in order to modulate a voltage applied to the liquid-crystal cell LC201.

In addition, as will be described later, the storage-capacitor signal CS generated by the CS driver 1020 has such a value that a process carried out by the correction circuit 109 to correct a pixel potential detected in the monitor pixel section 108 produces a certain electric potential which is the value of the storage-capacitor signal CS.

On the basis of a horizontal start pulse HST serving as a command to start a horizontal scan operation and a horizontal clock HCK serving as the reference pulse of the horizontal scan operation, the horizontal driving circuit 103 sequentially samples the input image signal Vsig every 1H or for each horizontal scan period H in order to write the input image signal Vsig at one time into the pixel circuits PXLC on a row selected by the vertical driving circuit 102 through the signal lines 107-1 to 107-*n*. It is to be noted that, in place of the horizontal clock HCK, vertical clocks HCK and HCKX having phases opposite to each other can be used.

The common-voltage generation circuit 104 is a circuit for generating the common voltage Vcom which is a series of pulses with a small amplitude and a polarity typically changing once every horizontal scan period or every 1H. The common-voltage generation circuit 104 supplies the common voltage Vcom to the second pixel electrode of the liquid-crystal cell LC201 employed in every pixel circuit PXLC of the available pixel section 101 by way of supply lines not shown in the figure.

Each of the amplitude ΔVcom of the common voltage Vcom and the CS electric potential ΔVcs is set at such a value that both the black luminance and the white luminance can be optimized. The CS electric potential ΔVcs is the difference ΔVcs between the first level CSH and the second level CSL. For example, as will be described later, each of the amplitude ΔVcom of the common voltage Vcom and the CS electric potential ΔVcs is set at such a value that an effective pixel electric potential ΔVpix-W applied to the liquid crystal cell LC201 in a white display does not exceed 0.5 V.

FIG. 1 shows a typical configuration in which the common-voltage generation circuit 104 is embedded in a liquid crystal panel. However, it is also possible to provide a configuration in which the common-voltage generation circuit 104 is provided outside the liquid crystal panel as a circuit for generating the common voltage Vcom.

FIG. 4 is a diagram showing a typical configuration of the common-voltage generation circuit 104 according to the embodiment. The typical configuration shown in the diagram of FIG. 4 is a configuration of the common-voltage generation circuit 104 having some components provided outside the liquid crystal panel as components for generating the common voltage Vcom having a small amplitude.

The common-voltage generation circuit 104 shown in the diagram of FIG. 4 employs flicker adjustment resistors R1 and R2, a smoothing capacitor C1 and a capacitor C2, which are provided outside the pixel panel, as well as a line resistor Rcom and a capacitor Ccom, which are provided inside the pixel panel. The capacitor C2 is a capacitor for producing the small amplitude ΔVcom of the common voltage Vcom. The line resistor Rcom is the resistor of a Vcom supply line 110 whereas the capacitor Ccom is a parasitic capacitor of the Vcom supply line 110.

The flicker adjustment resistors R1 and R2 are connected to each other by a connection node ND1 to form a series circuit between a supply line of a power-supply voltage VCC and a ground line GND, generating a voltage equal to a fraction of the power-supply voltage VCC at the connection node ND1 between the resistors R1 and R2. The resistor R2 is a variable-resistance resistor allowing the voltage generated at the connection node ND1 to be adjusted.

The connection node ND1 is connected to a panel terminal T. The first electrode of the smoothing capacitor C1 is wired to a line connecting connection node ND1 and the panel terminal T to each other whereas the second electrode of the smoothing capacitor C1 is wired to the ground.

In the same way, the first electrode of the capacitor C2 is wired to the line connecting connection node ND1 and the panel terminal T to each other. However, the second electrode of the capacitor C2 is wired to a line supplying a signal FRP.

The small amplitude ΔVcom of the common voltage Vcom generated by the common-voltage generation circuit 104 shown in the diagram of FIG. 4 is expressed by the following equation.

$$\Delta V\text{com}=\{C2/(C1+C2+C\text{com})\}\times FRP \quad \text{[Eq. 1]}$$

The small amplitude ΔVcom is generated due to a capacitive coupling effect. As an alternative, the small amplitude ΔVcom can also be generated digitally.

It is desirable to generate the small amplitude ΔVcom having a very small magnitude typically in a range of about 10 mV to 1.0 V. This is because, if the small amplitude ΔVcom has a magnitude outside the range, the amplitude ΔVcom will exhibit small effects such as an effect of improving a response speed in the event of overdriving and an effect of reducing acoustic noises.

As described above, in the capacitive coupling driving operations each carried out by the liquid-crystal display apparatus 100 as an operation based on a capacitive coupling effect, each of the amplitude ΔVcom and the CS electric potential ΔVcs is set at such a value that both the black luminance and the white luminance can be optimized. For example, in the case of a white display, each of the CS electric potential ΔVcs and the amplitude ΔVcom is set at such a value that an effective pixel electric potential ΔVpix-W applied to the liquid-crystal cell LC201 does not exceed 0.5 V. The capacitive coupling driving operation according to the embodiment is explained in more detail as follows.

FIGS. 5A to E show timing charts of the waveforms of main driving signals in the liquid-crystal cell of the embodiment. To be more specific, FIG. 5A is a diagram showing the timing chart of the gate pulse GP_N, FIG. 5B is a diagram showing the timing chart of the common voltage Vcom, FIG. 5C is a diagram showing the timing chart of the storage signal CS_N, FIG. 5D is a diagram showing the timing chart of the image signal Vsig and FIG. 5E is a diagram showing the timing chart of the signal Vpix-N.

In the capacitive coupling driving operation carried out in accordance with the embodiment, the common voltage Vcom is not a fixed DC voltage. Instead, the common voltage Vcom is a series of pulses with a small amplitude and a polarity typically changing once every horizontal scan period or once every 1H. The common voltage Vcom is supplied to the second pixel electrode of the liquid-crystal cell LC201 in every pixel circuit PXLC.

In addition, the storage-capacitor lines 106-1 to **106-*m* are provided independently of each other for the m respective rows of the matrix. The vertical driving circuit 102 also asserts storage-capacitor signals CS1 to CSm on the storage-capacitor lines 106-1 to 106-*m* respectively. Each of the storage-capacitor signals CS1** to CSm is set selectively at a first level CSH such as a voltage in the range 3 to 4 V or a second level CSL such as 0 V.

In the capacitive coupling driving operation, the effective pixel electric potential ΔVpix applied to the liquid crystal can be expressed by Eq. 2 given as follows.

$$\Delta Vpix = Vsig + \frac{Ccs}{Ccs + Clc + Cg + Csp} \times \Delta Vcs + \frac{Clc}{Ccs + Clc + Cg + Csp} \times \frac{\Delta Vcom}{2} - Vcom \approx Vsig + \frac{Ccs}{Ccs + Clc} \times \Delta Vcs + \frac{Clc}{Ccs + Clc} \times \frac{\Delta Vcom}{2} - Vcom \quad \text{[Eq. 2]}$$

Notations used in Eq. 2 are explained by referring to FIG. 6 as follows. Notation Vsig denotes the image signal voltage. Notation Ccs denotes the capacitance of the storage capacitor. Notation Clc denotes the capacitance of the liquid crystal cell. Notation Cg is a stray capacitance between the node ND201 and the gate line. Notation Csp is a stray capacitance between the node ND201 and the signal line. Notation ΔVcs denotes the electric potential of the storage-capacitor signal CS. Notation Vcom denotes the common voltage.

The second term {Ccs/(Ccs+Clc)} ΔVcs of the approximation equation in Eq. 2 is a term causing the white luminance side to become black or to sink due to the nonlinearity property of the liquid crystal dielectric constant ∈. On the other hand, the third term {Clc/(Ccs+Clc)} ΔVcom/2 is a term causing the white luminance side to become more white or to float due to the nonlinearity property of the liquid crystal dielectric constant ∈.

That is to say, the capacitive coupling driving operation is carried out by compensating for a sinking portion by making use of a function to make the low electric potential side (or the white luminance side) white, that is, a function to float the low electric potential side (or the white luminance side). For this reason, each of the CS electric potential ΔVcs and an amplitude ΔVcom is set at such a value that both the black luminance and the white luminance can be optimized. As a result, an optimum contrast level can be obtained.

Figure 7A:
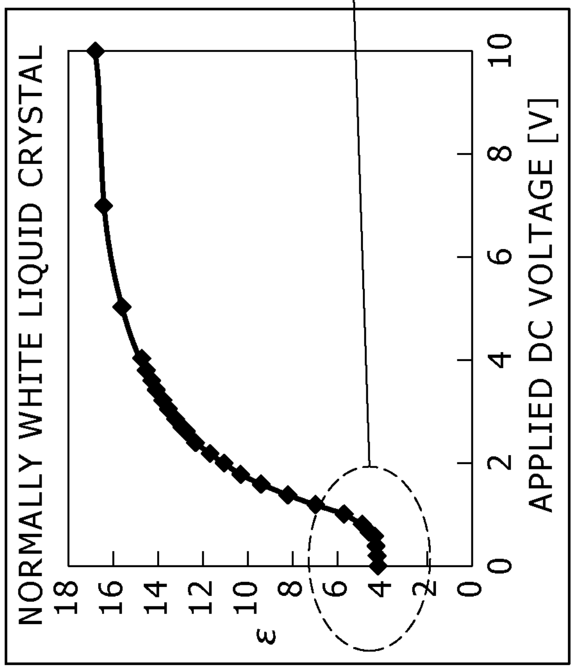
FIGS. 7A and 7B are each an explanatory diagram referred to in description of a criterion for selecting the value of an effective pixel electric potential ΔVpix-W applied to the liquid crystal in a white display for a liquid crystal material (referred to as a normally white liquid crystal) used in the display apparatus according to the first embodiment of the present invention.
Figure 7B:
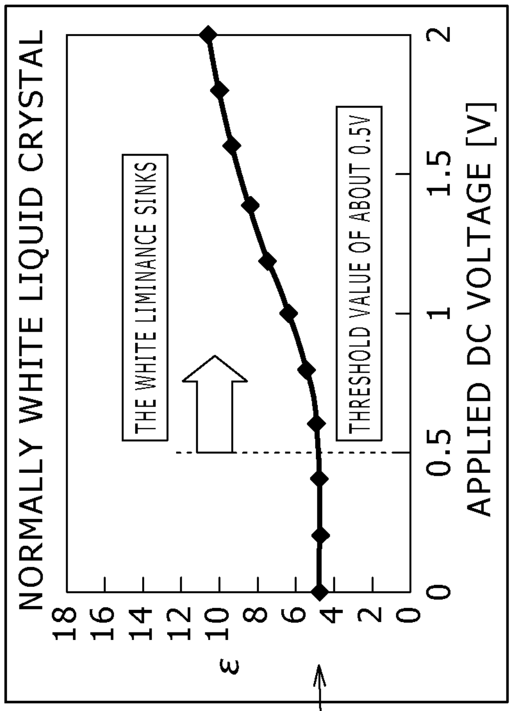

Each of FIGS. 7A and 7B is an explanatory diagram referred to in description of a criterion for selecting the value of the effective pixel electric potential ΔVpix-W applied to the liquid crystal in a white display for a liquid crystal material used in the liquid-crystal display apparatus 100. In this case, the liquid crystal material used in the liquid-crystal display apparatus 100 is the normally white liquid crystal. To put it in detail, FIG. 7A is a diagram showing a characteristic representing a relation between the liquid crystal dielectric constant sand the voltage applied to the liquid crystal whereas FIG. 7B is an enlarged diagram showing a portion enclosed by an ellipse as a portion of the characteristic shown in the diagram of FIG. 7A.

In accordance with the characteristic of the liquid crystal material used in the liquid-crystal display apparatus 100, if a voltage at least equal to about 0.5 V is applied to the liquid-crystal cell, the white luminance sinks inevitably. Thus, in order to optimize the white luminance, it is necessary to keep the effective pixel electric potential ΔVpix-W applied to the liquid-crystal cell in a white display at a value not greater than 0.5 V. For this reason, each of the CS electric potential ΔVcs and the amplitude ΔVcom is set at such a value that the effective pixel electric potential ΔVpix-W applied to the liquid crystal does not exceed 0.5 V.

An actual evaluation indicates that, by setting the CS electric potential ΔVcs at 3.8 V and the amplitude ΔVcom at 0.5 V, an optimum contrast level can be obtained.

Figure 8:
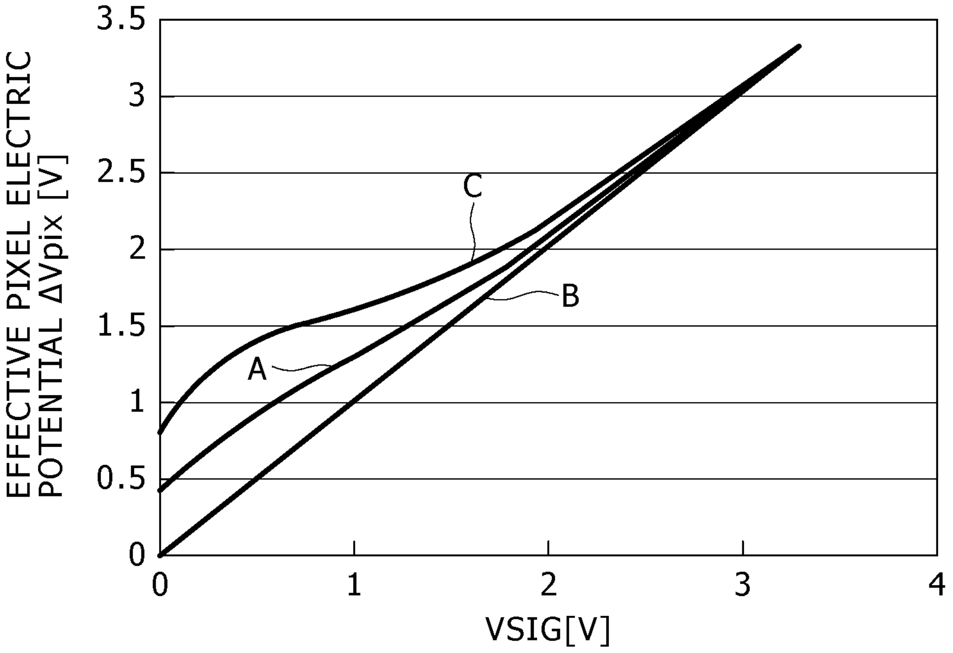
FIG. 8 is a diagram showing relations between the image signal voltage and the effective pixel electric potential for a driving method according to the first embodiment of the present invention, a relevant capacitive-coupling driving method and the ordinary 1H Vcom driving method.

FIG. 8 is a diagram showing relations between the image signal voltage and the effective pixel electric potential for three driving methods, i, e., a driving method according to the embodiment of the present invention, a relevant capacitive-coupling driving method and the ordinary 1H Vcom driving method.

In the diagram of FIG. 8, the horizontal axis represents the image signal Vsig whereas the vertical axis represents the effective pixel electric potential ΔVpix. In the diagram of FIG. 8, a curve A represents a characteristic for the driving method according to the embodiment of the present invention. A curve C represents a characteristic for the relevant capacitive-coupling driving method. A curve B represents a characteristic for the ordinary 1H Vcom driving method.

As is obvious from the characteristics shown in the diagram of FIG. 8, the driving method according to the embodiment of the present invention provides a sufficiently improved characteristic in comparison with the relevant capacitive-coupling driving method.

Figure 9:
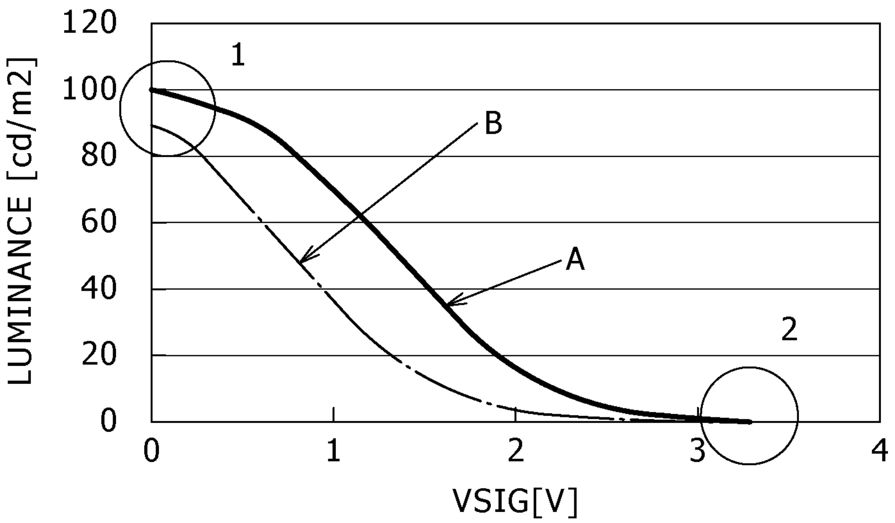
FIG. 9 is a diagram showing relations between the image signal voltage and the luminance for the driving method according to the first embodiment of the present invention and the relevant capacitive-coupling driving method.

FIG. 9 is a diagram showing relations between the image signal voltage Vsig and the luminance for the driving method according to the embodiment of the present invention and the relevant capacitive-coupling driving method.

In the diagram of FIG. 9, the horizontal axis represents the image signal Vsig whereas the vertical axis represents the luminance. In the diagram of FIG. 9, a curve A represents a characteristic for the driving method according to the embodiment of the present invention whereas a dashed line B represents a characteristic for the relevant capacitive-coupling driving method.

As is obvious from the characteristics shown in the diagram of FIG. 9, when the black luminance (2) is optimized in accordance with the relevant capacitive-coupling driving method, the white luminance (1) sinks. In accordance with the driving method according to the embodiment of the present invention, on the other hand, the amplitude of the common voltage Vcom is made small so that both the black luminance (2) and the white luminance (1) can be optimized.

Eq. 3 given below shows the values of the effective pixel electric potential ΔVpix-B for a black display and the effective pixel electric potential ΔVpix-W for a white display. The values of the ΔVpix-B and the ΔVpix-W are obtained by actually inserting numerical values into Eq. 2 for the driving method according to the embodiment as substitutes for the terms of Eq. 2.

By the same token, Eq. 4 given below shows the values of the effective pixel electric potential ΔVpix-B for a black display and the effective pixel electric potential ΔVpix-W for a white display. The values of the effective pixel electric potential ΔVpix-B and the effective pixel electric potential ΔVpix-W are obtained by actually inserting numerical values into Eq. 1 for the relevant capacitive-coupling driving method as substitutes for the terms of Eq. 1.

[Eq. 3]

(1) For a black display $$\begin{aligned}\Delta \text{Vpix\_B} &= Vsig + \frac{Ccs}{\text{Clc\_b} + Ccs} \times \Delta Vcs + \frac{\text{Clc\_b}}{\text{Clc\_b} + Ccs} \times \frac{\Delta Vcom}{2} - Vcom \\ &= 3.3\text{ V} + 1.65 - 1.65\text{ V} \\ &= \boxed{3.3\text{ V}}\end{aligned}$$

← The black luminance is optimized (2) For a white display $$\begin{aligned}\Delta \text{Vpix\_W} &= Vsig + \frac{Ccs}{\text{Clc\_w} + Ccs} \times \Delta Vcs + \frac{\text{Clc\_w}}{\text{clc\_w} + Ccs} \times \frac{\Delta Vcom}{2} - Vcom \\ &= 0.0\text{ V} + 2.05 - 1.65\text{ V} \\ &= \boxed{0.4\text{ V}}\end{aligned}$$

← The white luminance is optimized

[Eq. 4]

(1) For a black display $$\begin{aligned}\Delta \text{Vpix\_B} &= Vsig + \frac{Ccs}{\text{Clc\_b} + Ccs} \times \Delta Vcs - Vcom \\ &= 3.3\text{ V} + 1.65 - 1.65\text{ V} \\ &= \boxed{3.3\text{ V}}\end{aligned}$$

← The black luminance is optimized (2) For a white display $$\begin{aligned}\Delta \text{Vpix\_W} &= Vsig + \frac{Ccs}{\text{Clc\_w} + Ccs} \times \Delta Vcs - Vcom \\ &= 0.0\text{ V} + 2.45 - 1.65\text{ V} \\ &= \boxed{0.8\text{ V}}\end{aligned}$$

← The white luminance sinks.

As is obvious from Eqs. (3) and (4), in the case of a black display, the effective pixel electric potential ΔVpix-B is 3.3 V for both the driving method according to the embodiment and the relevant capacitive-coupling driving method. Thus, the black luminance is optimized. As is obvious from Eq. 4, however, in the case of a white display, the effective pixel electric potential ΔVpix-W is 0.8 V, which is greater than 0.5 V, for the relevant capacitive-coupling driving method. Thus, the white luminance inevitably sinks as explained previously by referring to FIG. 9B.

As is obvious from Eq. 3, however, in the case of a white display, the effective pixel electric potential ΔVpix-W is 0.4 V, which is smaller than 0.5 V, for the driving method according to the embodiment. Thus, the white luminance is optimized as explained earlier by referring to FIG. 9A.

The embodiment is characterized in that the correction circuit 109 generates a correction signal used for optimizing the storage-capacitor signal CS. The following description explains a concrete typical configuration in which the correction circuit 109 generates a correction signal used for optimizing the storage-capacitor signal CS. By adopting such a configuration, the optical characteristic of the liquid-crystal display apparatus 100 can be optimized.

In this embodiment, the dielectric constant of the liquid-crystal cell LC201 varies due to changes of the driving temperature, the thickness of an insulation film employed in the storage capacitor CS201 varies due to variations generated in the mass production of the products and the gap of the liquid-crystal cell LC201 varies also due to variations generated in the mass production of the products. These variations cause an electric potential applied to the liquid-crystal cell LC201 to vary. For this reason, the variations are electrically detected in order to suppress the variations of the electric potential. In this way, it is possible to eliminate the effects of the dielectric-constant variations caused by the changes of the driving temperature, the insulation-film thickness variations and the cell gap variations caused by the variations generated in the mass production.

First of all, prior to explanation of a correction circuit according to the embodiment, on the basis of a model described below as a model of an effective pixel voltage, the following description explains a reason why a correction method according to the embodiment is adopted.

Eq. 5 given below is a model of an effective pixel voltage applied in an ordinary 1H Vcom inversion driving operation. It is obvious that an underlined term of Eq. 5 is fixed even if the capacitance Ccs of the storage capacitor CS and the capacitance Clc of the liquid-crystal cell LC vary because the denominator of a quotient in the term is equal to the numerator thereof. Thus, the effective pixel electric potential ΔVpix does not change. That is to say, even if the capacitance Ccs of the storage capacitor CS and the capacitance Clc of the liquid-crystal cell LC vary, the pixel voltage applied to the liquid-crystal cell LC does not change. The capacitance Ccs of the storage capacitor CS changes due to the insulation-film thickness variations. On the other hand, the capacitance Clc of the liquid-crystal cell LC changes due to the dielectric-constant variations caused by the changes of the driving temperature and/or the pixel-voltage variations caused by the variations of the gap of the liquid-crystal cell or the gap between the liquid-crystal layers.

[Eq. 5]

$$\begin{aligned}\Delta Vpix &= Vsig + \frac{Ccs + Clc}{Ccs + Clc + Cg + Csp} \times \Delta Vcom - Vcom \\ &\approx Vsig + \frac{Ccs + Clc}{Ccs + Clc} \times \Delta Vcom - Vcom\end{aligned}$$

Eq. 6 given below is a model of an effective pixel voltage applied in a capacitive coupling driving operation. It is obvious that an underlined term of Eq. 6 changes if the capacitance Ccs and the capacitance Clc vary because the denominator of a quotient in the term is different from the numerator thereof.

[Eq. 6]

$$\begin{aligned}\Delta Vpix &= Vsig + \frac{Ccs}{Ccs + Clc + Cg + Csp} \times \Delta Vcs - Vcom \\ &\approx Vsig + \frac{Ccs}{Ccs + Clc} \times \Delta Vcs - Vcom\end{aligned}$$

In order to solve this problem, it is necessary to compensate for changes of the capacitances Ccs and Clc included in the underlined term of Eq. 6. In the case of this embodiment, the CS electric potential ΔVcs is changed or corrected in order to sustain the underlined term at a constant value.

The problems caused by the capacitive coupling driving method making use of the coupling effects of capacitor wires can be interpreted in a positive way as a capability of freely changing the luminance by utilization of a difference in electric potential between capacitor wires. In this embodiment, a monitor pixel section including dummy pixels is provided in the liquid crystal panel. On the basis of detected changes of a pixel electric potential appearing in the monitor pixel section, the embodiment can implement a liquid-crystal display apparatus 100 capable of optimizing the luminance by utilization of a difference in electric potential between capacitor wires or by driving a reference driver to carry out a correction operation.

It is to be noted that the reference driver not shown in the diagram of FIG. 1 functions as a gradation-voltage generation circuit for generating image pixel data to be conveyed by the signal lines as image signals.

The following description explains a concrete configuration of the correction circuit according to this embodiment.

Figure 10:
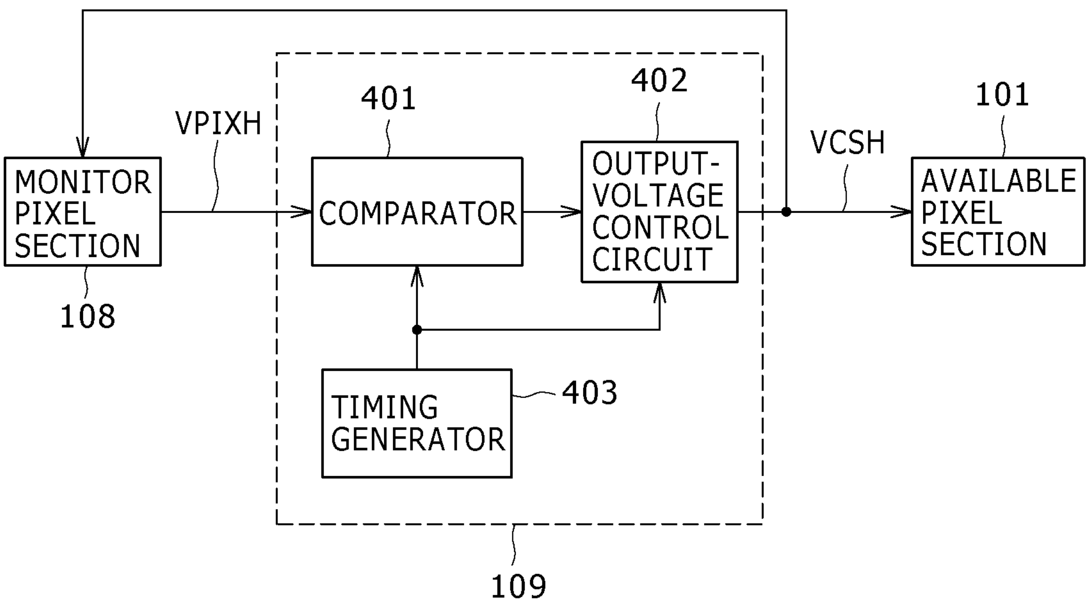
FIG. 10 is a block diagram showing the display apparatus according to the first embodiment of the present invention.

FIG. 10 is a block diagram showing the liquid-crystal display apparatus 100 according to this embodiment.

In the liquid-crystal display apparatus 100 according to this embodiment, an electric potential output by a monitor pixel section 108 is selectively supplied by a switch not shown in the figure to a comparator 401 employed in a correction circuit 109. A comparison result output by the comparator 401 is supplied to an available pixel section 101 as a correction signal by way of a output-voltage control circuit 402 also employed in the correction circuit 109 as a control circuit for converting the result of the comparison into the correction signal. The comparator 401 and the output-voltage control circuit 402 operate in accordance with control executed by a timing generator 403 also employed in the correction circuit 109.

The comparison result output by the comparator 401 and supplied to the available pixel section 101 is also fed back to the monitor pixel section 108 as the correction signal. Thus, while the operation of the liquid-crystal display apparatus 100 is being carried out, the correction circuit 109 corrects the pixel electric potential.

Figure 11:
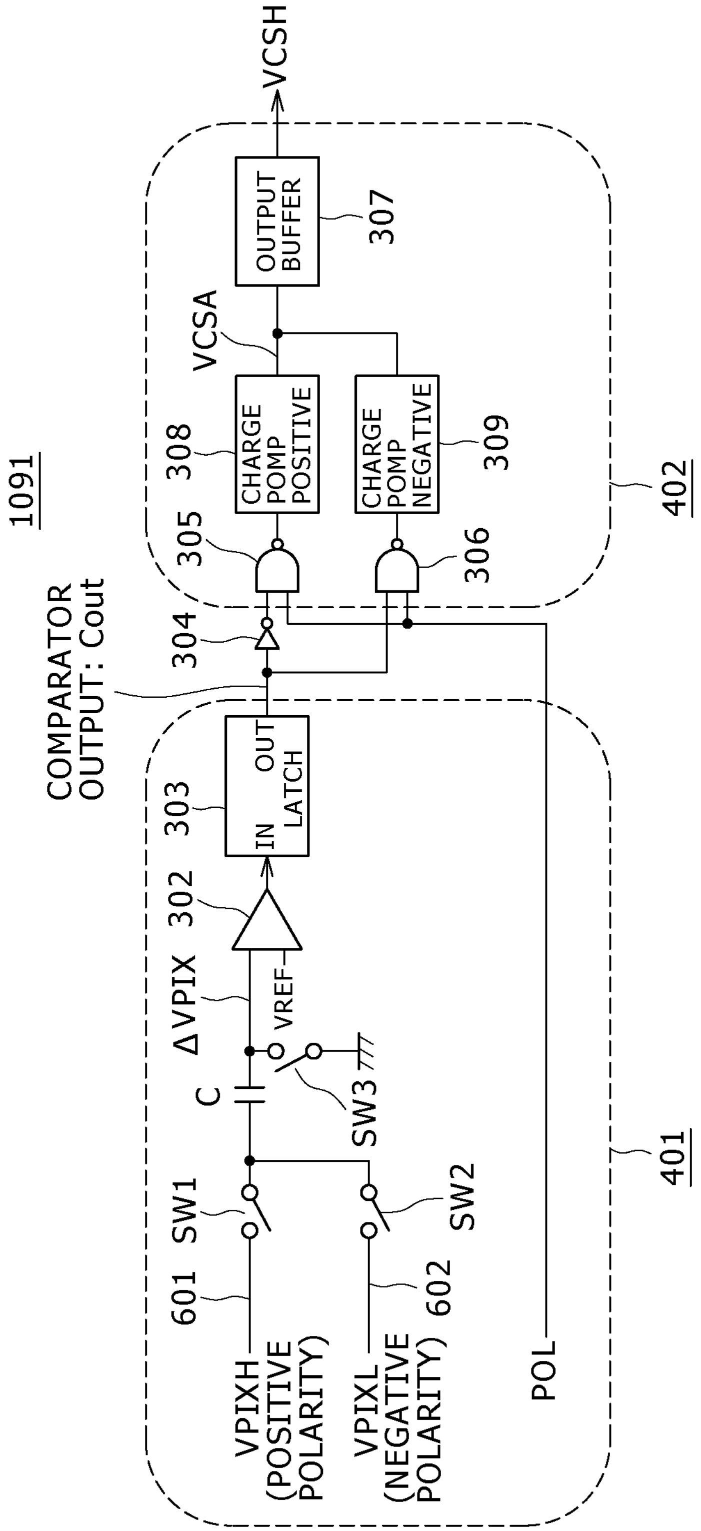
FIG. 11 is a diagram showing a correction circuit according to the first embodiment of the present invention.
Figure 12:
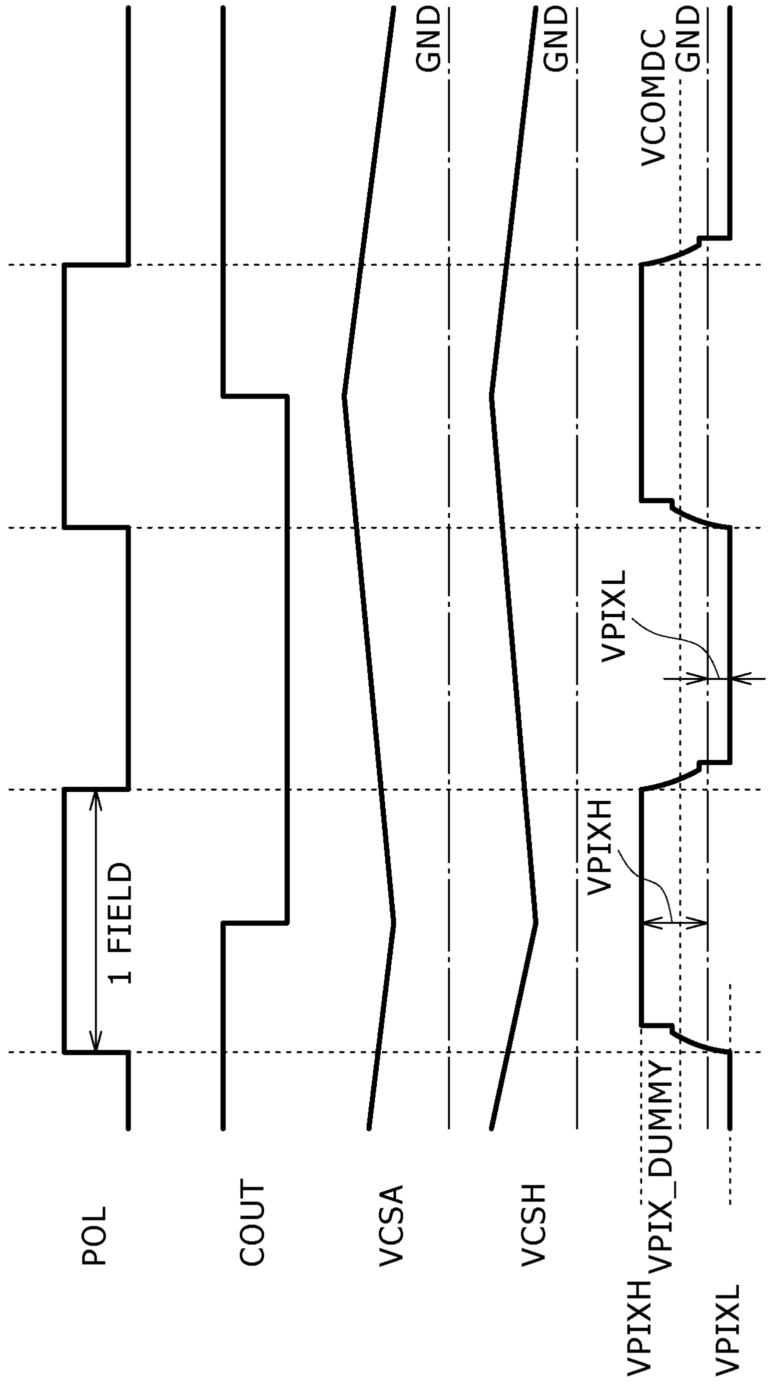
FIG. 12 shows timing charts of signals appearing in the correction circuit.

FIG. 11 is a circuit diagram showing a first embodiment implementing a correction circuit 1091, which is denoted by reference numeral 109, in accordance with the present embodiment. The first embodiment is a concrete circuit configuration of the correction circuit 109. FIG. 12 shows timing charts of signals appearing in the correction circuit 109.

In the timing charts shown in FIG. 12, notation POL denotes polarities in a pixel write operation, notation Cout denotes a comparison result output by the comparator 401, notation VCSA denotes an intermediate signal output by a positive charge pumping circuit 308 or a negative charge pumping circuit 309, notation Vcsh denotes a correction signal output by an output buffer 307, notation VpixH denotes a pixel electric potential having a positive polarity in the monitor pixel section 108 and notation VpixL denotes a pixel electric potential having a negative polarity in the monitor pixel section 108.

The correction circuit 1091 according to the first embodiment of the present invention employs the comparator 401 and the output-voltage control circuit 402 connected to the output terminal of the comparator 401. The comparator 401 has a capacitor C, a voltage comparison device 302 and a latch circuit 303. The first electrode of the capacitor C is connected to a wire 601 supplying the pixel electric potential VpixH generated by the monitor pixel section 108 and a wire 602 supplying the pixel electric potential VpixL also generated by the monitor pixel section 108. The second electrode of the capacitor C is connected to an input terminal of the voltage comparison device 302. The other input terminal of the voltage comparison device 302 receives a reference voltage Vref. The output terminal of the voltage comparison device 302 is connected to the input terminal of the latch circuit 303. The wire 601 on the positive-polarity side includes a first switch SW1 whereas the wire 602 on the negative-polarity side includes a second switch SW2. A third switch SW3 is connected between the ground and a connection point between the second electrode of the capacitor C and the input terminal of the voltage comparison device 302.

The output-voltage control circuit 402 connected to the output terminal of the comparator 401 employs a first gate circuit 305, a second gate circuit 306, the positive charge pumping circuit 308 mentioned before, the negative charge pumping circuit 309 cited earlier and the aforementioned output buffer 307. Each of the first gate circuit 305 and the second gate circuit 306 receives the comparison result output by the comparator 401. The positive charge pumping circuit 308 and the negative charge pumping circuit 309 are connected to the first gate circuit 305 and the second gate circuit 306 respectively. An inverter 304 is provided between the comparator 401 and the first gate circuit 305. The output buffer 307 is a buffer for outputting a correction signal output by the positive charge pumping circuit 308 or the negative charge pumping circuit 309 to the available pixel section 101 and the monitor pixel section 108.

The correction circuit 1091 having the configuration described above detects a dynamic range of the pixel circuit PCLC as described below in detail. The dynamic range is the difference between the pixel electric potential having the positive polarity and the pixel electric potential having the negative polarity.

The comparator 401 according to this embodiment finds the dynamic range ΔVpix of the pixel and compares the dynamic range ΔVpix with the reference voltage Vref in the voltage comparison device 302. As described above, the dynamic range ΔVpix is the difference between the pixel electric potential VpixH having the positive polarity and the pixel electric potential VpixL having the negative polarity as shown in the timing charts of FIG. 12.

First of all, the second switch SW2 and the third switch SW3 are turned on at the same time. With the second switch SW2 and the third switch SW3 turned on, the pixel electric potential VpixL having the negative polarity is stored in the capacitor C through the wire 602. As a result, the first and second electrodes of the capacitor C are sustained at the pixel electric potential VpixL having the negative polarity and the ground respectively. Typically, the pixel electric potential VpixL having the negative polarity is −2 V whereas the electric potential of the ground is 0 V.

Then, the second switch SW2 and the third switch SW3 are turned off at the same time whereas the first switch SW1 is turned on. With the second switch SW2 and the third switch SW3 turned off and the first switch SW1 turned on, the pixel electric potential VpixH having the positive polarity is applied to the capacitor C through the wire 601. As a result, the first electrode of the capacitor C is sustained at the pixel electric potential VpixH having the positive polarity. If the pixel electric potential VpixH having the positive polarity is 1 V for example, the first electrode of the capacitor C is sustained at 1 V. As a result of the operation carried out before to turn on the second switch SW2 and the third switch SW3, the first electrode of the capacitor C was sustained at −2 V which is the pixel electric potential VpixL having the negative polarity. Thus, the second electrode of the capacitor C is now sustained at the dynamic range ΔVpix which is the difference between the pixel electric potential VpixH having the positive polarity and the pixel electric potential VpixL having the negative polarity. Since the pixel electric potential VpixH having the positive polarity is 1 V whereas the pixel electric potential VpixL having the negative polarity is −2 V, the dynamic range ΔVpix is found out to have a value shown as follows:

$$\Delta Vpix = VpixH - VpixL = 3\ V.$$

As a result, the dynamic range ΔVpix of 3 V is supplied to the voltage comparison device 302 by way of the capacitor C.

By carrying out the operations described above, the dynamic range ΔVpix can be converted into an absolute value relative to the ground. It is to be noted that, in this embodiment, the pixel electric potential VpixH and the pixel electric potential VpixL are supplied selectively by a switch not shown in the figure to the comparator 401 employed in the correction circuit 1091 through the wires 601 and 602 respectively.

The dynamic range ΔVpix supplied to the voltage comparison device 302 as the dynamic range of the electric potentials of the pixel is compared with the reference voltage Vref also supplied to the voltage comparison device 302 in order to determine whether the dynamic range ΔVpix is smaller or greater than the reference voltage Vref. If the reference voltage Vref is 2.85 V whereas the dynamic range ΔVpix is 3 V for example, the voltage comparison device 302 determines that the dynamic range ΔVpix is greater than the reference voltage Vref.

A comparison result Cout generated by the voltage comparison device 302 is output digitally to the output-voltage control circuit 402 by way of the latch circuit 303.

In the output-voltage control circuit 402, the comparison result Cout is supplied to the first gate circuit 305 and the second gate circuit 306. However, the comparison result Cout is supplied to the first gate circuit 305 through the inverter 304 for inverting the comparison result Cout.

Thus, if the comparison result Cout indicates that the dynamic range ΔVpix is smaller than the reference voltage Vref, the first gate circuit 305 drives the positive charge pumping circuit 308 to generate an output VCSA, which is converted by the output buffer 307 into a correction signal Vcsh for optimizing the CS electric potential ΔVcs. Then, the output buffer 307 supplies the correction signal Vcsh to the available pixel section 101 as well as the monitor pixel section 108. If the comparison result Cout indicates that the dynamic range ΔVpix is greater than the reference voltage Vref, on the other hand, the second gate circuit 306 drives the negative charge pumping circuit 309 to generate an output VCSA, which is converted by the output buffer 307 into the correction signal Vcsh for optimizing the CS electric potential ΔVcs in the same way. Then, by the same token, the output buffer 307 supplies the correction signal Vcsh to the available pixel section 101 as well as the monitor pixel section 108.

As described before, the available pixel section 101 makes use of the correction signal Vcsh to optimize the CS electric potential ΔVcs. The correction signal Vcsh is also supplied to the monitor pixel section 108 so that an optimized pixel electric potential generated by the monitor pixel section 108 is supplied to the correction circuit 1091. In this way, the pixel electric potential is corrected while the operation of the liquid-crystal display apparatus 100 is being carried out.

As described above, the correction circuit 1091 according to the embodiment finds a correction signal Vcsh which gives a proper CS electric potential ΔVcs in order to provide the liquid-crystal display apparatus 100 with such a storage-capacitor signal CS that the dynamic range ΔVpix representing the difference between the pixel electric potential VpixH having the positive polarity and the pixel electric potential VpixL having the negative polarity is fixed.

Figure 13A:
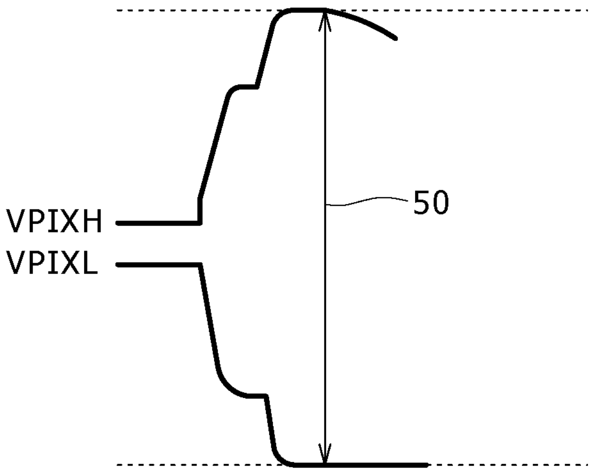
FIGS. 13A and 13B are each a diagram showing the waveforms of pixel electric potentials before and after a correction process.
Figure 13B:
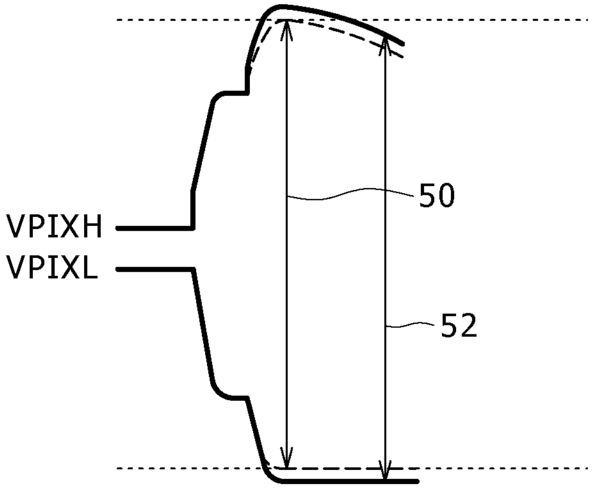

FIG. 13 is a plurality of diagrams each showing the waveforms of the pixel electric potential VpixH having the positive polarity and the pixel electric potential VpixL having the negative polarity in order to show the effect of the correction process carried out by the correction circuit 1091. To be more specific, FIG. 13A is a diagram showing the waveforms of the pixel electric potential VpixH having the positive polarity and the pixel electric potential VpixL having the negative polarity as waveforms obtained without the correction process carried out by the correction circuit 1091. However, the waveforms each indicated by a dashed line in the diagram of FIG. 13B are waveforms obtained without the correction process carried out by the correction circuit 1091 whereas the waveforms each indicated by a solid line in the diagram of FIG. 13B are waveforms obtained as a result of the correction process. An arrow 50 shows a proper pixel electric-potential amplitude. That is to say, it is desirable to generate electric potentials on the positive-polarity and negative-polarity sides as electric potentials having a difference with an amplitude equal to the magnitude indicated by the arrow 50. The waveforms each indicated by a solid line in the diagram of FIG. 13B as waveforms obtained as a result of the correction process having a pixel electric-potential amplitude indicated by an arrow 52. As is obvious from the diagram of FIG. 13B, however, the pixel electric-potential amplitude indicated by the arrow 52 is equal to the pixel electric-potential amplitude indicated by an arrow 50. That is to say, the pixel electric potentials on the positive-polarity and negative-polarity sides are so corrected that the pixel electric-potential amplitude is sustained as it is.

If the detected dynamic range ΔVpix is a voltage about equal to the reference voltage Vref, the correction circuit 1091 can be used without generating a problem. If the detected dynamic range ΔVpix is a voltage much higher than the reference voltage Vref, however, the dynamic range ΔVpix cannot be compared with the reference voltage Vref. If the reference voltage Vref is 2.85 V whereas the dynamic range ΔVpix is 5.7 V for example, the dynamic range ΔVpix cannot be compared with the reference voltage Vref. A second embodiment of the present invention implements a correction circuit for solving this problem.

Figure 14:
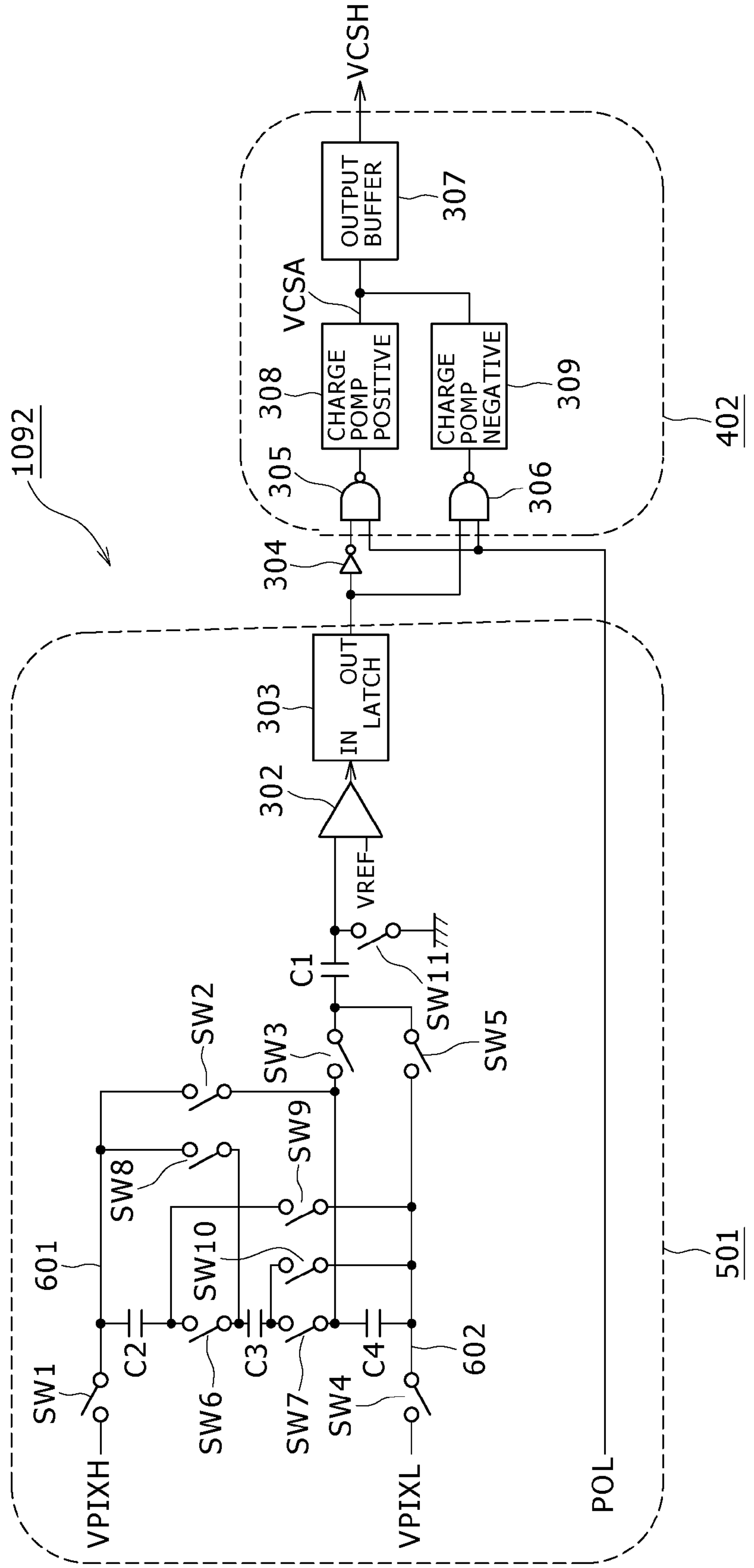
FIG. 14 is a diagram showing a correction circuit according to a second embodiment of the present invention.
Figure 17:
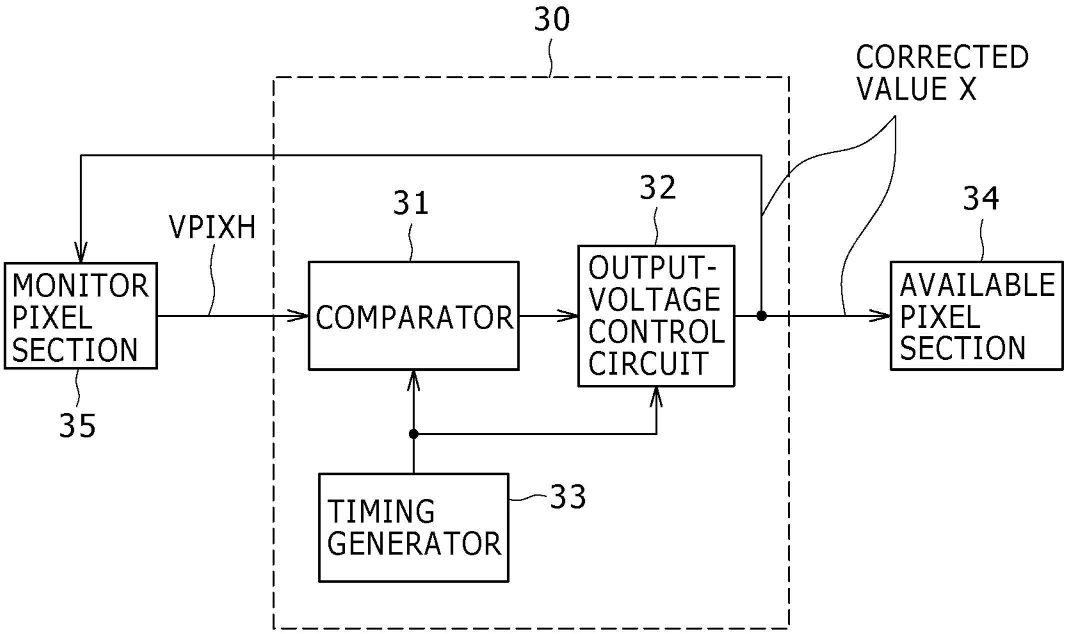
FIG. 17 is a block diagram showing the existing display apparatus.
Figure 18:
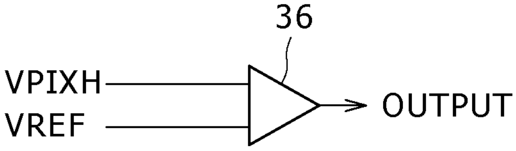
FIG. 18 is a diagram showing a comparator employed in the existing correction circuit.
Figure 19A:
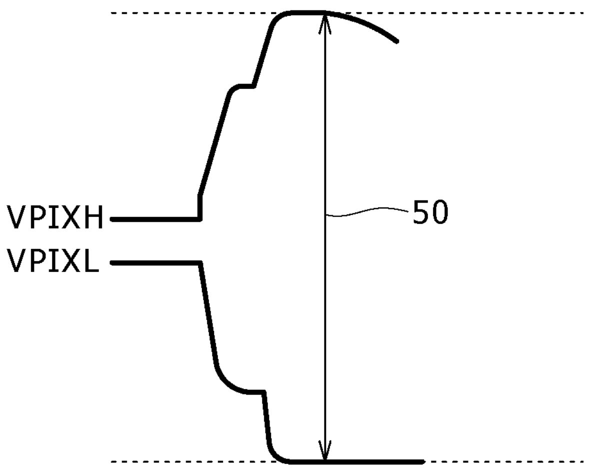
FIGS. 19A and 19B are each a diagram showing the waveforms of pixel electric potentials before and after a correction process.
Figure 19B:
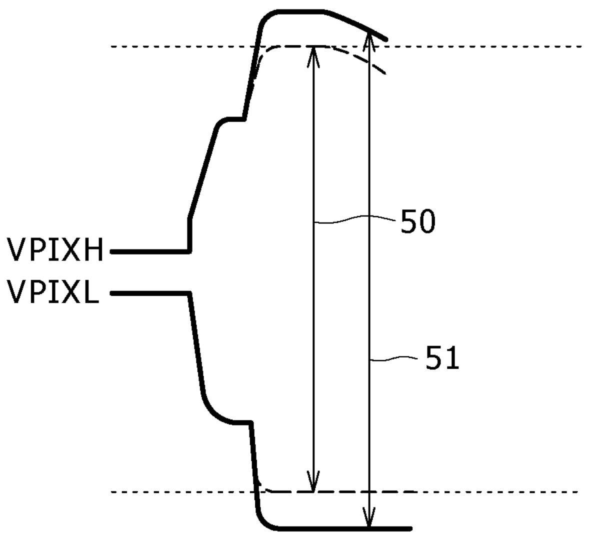

The second embodiment of the present invention is explained by referring to FIG. 14 as follows. The second embodiment is different from the first embodiment shown in the diagram of FIG. 11 in that the configuration of a comparator 501 employed in the second embodiment is different from the comparator 401 employed in the first embodiment. However, the remaining configurations in the second embodiment are identical with their respective configurations in the first embodiment. Elements shown in the diagram of FIG. 14 as elements identical with their respective counterparts shown in the diagram of FIG. 11 are denoted by the same reference numerals as the counterparts and the explanation of the identical elements is omitted in order to avoid duplications. A correction circuit 1092 shown in the diagram of FIG. 14 is a section employed in the liquid-crystal display apparatus 100 shown in the diagram of FIG. 1 or 10.

A comparator 501 employed in the correction circuit 1092 according to the second embodiment has a first capacitor C1, a second capacitor C2, a third capacitor C3, a fourth capacitor C4, a voltage comparison device 302 and a latch circuit 303. The first electrode of the first capacitor C1 is connected to wires 601 and 602. The second capacitor C2, the third capacitor C3 and the fourth capacitor C4 form a series circuit at the front stage located between the wires 601 and 602 as the front stage of the first capacitor C1. The wire 601 connected to the first electrode of the first capacitor C1 includes a first switch SW1, a second switch SW2 and a third switch SW3. A connection point between the first switch SW1 and the second switch SW2 is connected to the second capacitor C2. On the other hand, the wire 602 also connected to the first electrode of the first capacitor C1 includes a fourth switch SW4 and a fifth switch SW5. A sixth switch SW6 is connected between the second capacitor C2 and the third capacitor C3 whereas a seventh switch SW7 is connected between the third capacitor C3 and the fourth capacitor C4. An eighth switch SW8 is connected between a connection point between the sixth switch SW6 and the third capacitor C3 and a connection point located on the wire 601 as a connection point between the second switch SW2 and the second capacitor C2. By the same token, a ninth switch SW9 is connected between a connection point between the sixth switch SW6 and the second capacitor C2 and a connection point located on the wire 602 as a connection point between the fifth switch SW5 and the fourth capacitor C4. In the same way, a tenth switch SW10 is connected between a connection point between the seventh switch SW7 and the third capacitor C3 and a connection point located on the wire 602 as a connection point between the fifth switch SW5 and the fourth capacitor C4. A connection point between the seventh switch SW7 and the fourth capacitor C4 is wired to a connection point located on the wire 601 as a connection point between the second switch SW2 and the third switch SW3.

An eleventh switch SW11 is connected between the ground and a connection point between the first capacitor C1 and one input terminal of the voltage comparison device 302.

A reference voltage Vref is supplied to other input terminal of the voltage comparison device 302. The output terminal of the voltage comparison device 302 is connected to the input terminal of the latch circuit 303.

In the comparator 501, when the sixth switch SW6 and the seventh switch SW7 are turned on, the second capacitor C2, the third capacitor C3 and the fourth capacitor C4 form a series circuit between the wires 601 and 602. When the second switch SW2, the eighth switch SW8, the ninth switch SW9 and the tenth switch SW10 are turned on, on the other hand, the second capacitor C2, the third capacitor C3 and the fourth capacitor C4 form a parallel circuit between the wires 601 and 602.

The correction circuit 1092 having the configuration described above detects a dynamic range of the pixel circuit as described below in detail. The dynamic range is the difference between the pixel electric potential having the positive polarity and the pixel electric potential having the negative polarity.

First of all, in the comparator 501, the second switch SW2, the eighth switch SW8, the ninth switch SW9 and the tenth switch SW10 are turned on in order to reset electric-potential differences across the second capacitor C2, the third capacitor C3 and the fourth capacitor C4 at a uniform voltage.

Then, after the second switch SW2, the eighth switch SW8, the ninth switch SW9 and the tenth switch SW10 are turned off, the sixth switch SW6 and the seventh switch SW7 are turned on to be followed by an operation to turn on the first switch SW1 and the fourth switch SW4. In this state, an electric charge supplied from the pixel electric potential VpixH having the positive polarity and the pixel electric potential VpixL having the negative polarity is distributed among the second capacitor C2, the third capacitor C3 and the fourth capacitor C4. That is to say, an electric-potential difference of ΔVpix/3 appears across each of the second capacitor C2, the third capacitor C3 and the fourth capacitor C4 where notation ΔVpix denotes the dynamic range which is the difference between the pixel electric potential VpixH having the positive polarity and the pixel electric potential VpixL having the negative polarity as described before. In the second embodiment, for example, the pixel electric potential VpixH having the positive polarity and the pixel electric potential VpixL having the negative polarity are 6 V and −2.55 V respectively. In this case, an electric-potential difference of 2.85 V appears across each of the second capacitor C2, the third capacitor C3 and the fourth capacitor C4.

Then, the sixth switch SW6, the seventh switch SW7, the first switch SW1 and the fourth switch SW4 are turned off. Subsequently, the fourth switch SW4, the fifth switch SW5 and the first switch SW1 are turned on. As a result, the pixel electric potential VpixL having the negative polarity is supplied to the first capacitor C1 through the wire 602, sustaining the first electrode of the first capacitor C1 at the pixel electric potential VpixL and the second electrode of the first capacitor C1 at the voltage of the ground. For example, a negative-polarity voltage of −2.55 V is supplied to the first electrode of the first capacitor C1 whereas the second electrode of the first capacitor C1 is held at the ground voltage of 0 V.

Then, the fourth switch SW4, the fifth switch SW5 and the eleventh switch SW11 are turned off whereas the third switch SW3 is turned on. In this state, the first electrode of the fourth capacitor C4 is set at an electric potential of VpixH−(ΔVpix/3)×2. Thus, an electric potential appearing on the first electrode of the first capacitor C1 is also VpixH−(ΔVpix/3)×2 whereas an electric potential appearing on the second electrode of the first capacitor C1 is VpixH−(ΔVpix/3)×2−VpixL.

The electric potential of VpixH−(ΔVpix/3)×2−VpixL is supplied to one of the 2 input terminals of the voltage comparison device 302 to be compared with the reference voltage Vref supplied to the other input terminal of the voltage comparison device 302. Thus, an electric potential of 0.3 V is supplied to the first electrode of the first capacitor C1 whereas an electric potential of 2.85 V is supplied to the second electrode of the first capacitor C1. As described earlier, the electric potential of 2.85 V is one third of the dynamic range ΔVpix which is defined as the difference between the pixel electric potential VpixH having the positive polarity and the pixel electric potential VpixL having the negative polarity. Accordingly, in the same way as the first embodiment, the voltage comparison device 302 compares the reference voltage Vref supplied thereto with 2.85 V which is one third of the dynamic range ΔVpix.

In the same way as the first embodiment, the comparator 501 outputs the comparison result Cout to the output-voltage control circuit 402 which then, on the basis of the comparison result Cout, outputs the correction signal Vcsh for correcting the storage-capacitor signal CS to the available pixel section 101 as well as the monitor pixel section 108. In actuality, in the available pixel section 101 and the monitor pixel section 108, the correction signal Vcsh is used for optimizing the CS electric potential ΔVcs and the optimized CS electric potential ΔVcs is used for correcting the storage-capacitor signal CS.

As described above, in accordance with the second embodiment, the dynamic range ΔVpix defined as the difference between the pixel electric potential VpixH having the positive polarity and the pixel electric potential VpixL having the negative polarity is divided into a fraction of the dynamic range ΔVpix, and the fraction of the dynamic range ΔVpix is supplied to the voltage comparison device 302. Thus, even if the detected dynamic range ΔVpix is a voltage much higher than the reference voltage Vref, a voltage reduction circuit employed in the comparator 501 divides the dynamic range ΔVpix into a fraction of the dynamic range ΔVpix, and the voltage comparison device 302 compares this small fraction with the reference voltage Vref. In the case of the second embodiment, the fraction of the dynamic range ΔVpix is one third of the dynamic range ΔVpix. However, the voltage reduction circuit can also be configured to include N capacitors, where notation N denoted a positive integer greater than 3, or include a capacitor having a variable capacitance so that the voltage reduction circuit is capable of freely controlling the magnitude of the fractional electric potential supplied to the voltage comparison device 302.

In addition, also in the case of the second embodiment, the dynamic range ΔVpix defined as the difference between the pixel electric potential VpixH having the positive polarity and the pixel electric potential VpixL having the negative polarity is controlled to a fixed value as shown in the diagram of FIG. 13. Thus, the optical characteristic of the liquid-crystal display apparatus 100 can be optimized.

As described above, in accordance with the first and second embodiments, the correction circuit optimizes the pixel electric potential so that variations of the γ characteristic can be suppressed. Thus, the yield and the merchantability can be improved. In addition, in the case of the second embodiment, even if the detected dynamic range ΔVpix is a voltage much higher than the reference voltage, a voltage reduction circuit employed in the comparator divides the dynamic range ΔVpix into a fraction of the dynamic range ΔVpix, and this small fraction is then compared with the reference voltage. Thus, it is not necessary to provide the comparator with a high reference voltage. As a result, since it is not necessary to provide the correction circuit with a high electric power, the power consumption can be reduced.

Each of the first and second embodiments described above implements an active-matrix display apparatus making use of liquid crystal cells each functioning as the display element (or the electro-optical device) of a pixel circuit. However, the scope of the present invention is by no means limited to such liquid-crystal display apparatus. That is to say, the present invention can be applied to all active-matrix display apparatus including an active-matrix EL (Electroluminescence) display apparatus making use of EL devices each functioning as the display element of a pixel circuit.

The display apparatus according to the first and second embodiments described above can be used as an LCD (Liquid-crystal display) panel which is the display panel of a direct-vision video display apparatus or a projection LCD apparatus such as a liquid-crystal projector. Examples of the direct-vision video display apparatus are a liquid-crystal monitor and a liquid-crystal view finder.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A display apparatus comprising:

a pixel section having a plurality of pixel circuits arranged two-dimensionally, each pixel circuit being provided at an intersection of a scan line and a signal line and including a switching device, a display element and a storage capacitor; and a correction circuit configured to correct a storage-capacitor voltage supplied to said storage capacitors, said correction circuit comprising (a) a capacitor that has a first electrode and a second electrode, (b) a voltage comparison device that has a first input terminal, a second input terminal, and an output terminal, the first input terminal being connected to the second electrode of said capacitor, the second input terminal being supplied with a reference voltage, (c) a first switch that is connected to the first electrode of said capacitor and supplied with a pixel electric potential having a positive polarity, (d) a second switch that is connected to the first electrode of said capacitor and supplied with a pixel electric potential having a negative polarity, (e) a third switch that is connected between ground and a connection point between the second electrode of said capacitor and the first input terminal of said voltage comparison device, and (f) an output-voltage control circuit, wherein, in a first period, one of the first switch and the second switch is turned on, the other is turned off, and the third switch is turned on, in a second period following the first period, the one of the first switch and the second switch is turned off, the other is turned on, and the third switch is turned off, in the second period, the first input terminal of said voltage comparison device is supplied with a difference between the pixel electric potential having the positive polarity and the pixel electric potential having the negative polarity from the second electrode of the capacitor, said voltage comparison device makes a comparison between said difference and said reference voltage, and said output-voltage control circuit converts a comparison result output by said voltage comparison device into a correction signal used for correcting said storage-capacitor voltage to be asserted on a storage-capacitor line used for supplying said storage-capacitor voltage.

2. The display apparatus according to claim 1, wherein said correction circuit has a voltage reduction circuit configured to divide said difference between the pixel electric potential having the positive polarity and the pixel electric potential having the negative polarity.

3. A method for correcting a pixel electric-potential in a display apparatus wherein:

said display apparatus comprises (a) a pixel section having a plurality of pixel circuits arranged two-dimensionally, each pixel circuit being provided at an intersection of a scan line and a signal line and including a switching device, a display element and a storage capacitor, and (b) a correction circuit configured to correct a storage-capacitor voltage supplied to said storage capacitors;

said correction circuit comprises (a) a capacitor that has a first electrode and a second electrode, (b) a voltage comparison device that has a first input terminal, a second input terminal, and an output terminal, the first input terminal being connected to the second electrode of said capacitor, the second input terminal being supplied with a reference voltage, (c) a first switch that is connected to the first electrode of said capacitor and supplied with a pixel electric potential having a positive polarity, (d) a second switch that is connected to the first electrode of said capacitor and supplied with a pixel electric potential having a negative polarity, (e) a third switch that is connected between the ground and a connection point between the second electrode of said capacitor and the first input terminal of said voltage comparison device, and (f) an output-voltage control circuit; and said method comprises the steps of (a) driving, in a first period, one of the first switch and the second switch to turn on, the other to turn off, and the third switch to turn on, (b) driving, in a second period following the first period, the one of the first switch and the second switch to turn off, the other to turn on, and the third switch to turn off, (c) driving, in the second period, said voltage comparison device configured to make a comparison between a difference between the pixel electric potential having the positive polarity and the pixel electric potential having the negative polarity supplied from the second electrode of the capacitor, and said reference voltage, and (d) driving said output-voltage control circuit configured to convert a comparison result output by said voltage comparison device into a correction signal used for correcting said storage-capacitor voltage to be asserted on a storage-capacitor line used for supplying said storage-capacitor voltage.

4. The pixel electric-potential correction method according to claim 3, said pixel electric-potential correction method further comprising the steps of:

dividing said difference between the pixel electric potential having the positive polarity and the pixel electric potential having the negative polarity into fractions of said difference; and driving the voltage comparison device to compare one of said fractions with said reference voltage.

* * * * *